(12) United States Patent
Xu et al.

(10) Patent No.: US 11,671,932 B2
(45) Date of Patent: Jun. 6, 2023

(54) TIMING ADJUST FOR A NON-TERRESTRIAL NETWORK

(71) Applicant: QUALCOMM Incorporated, San Diego, CA (US)

(72) Inventors: Huilin Xu, San Diego, CA (US); Jun Ma, San Diego, CA (US); Qiang Wu, San Diego, CA (US); Xiao Feng Wang, San Diego, CA (US); Iyab Issam Sakhnini, San Diego, CA (US); Dan Zhang, San Diego, CA (US); Liangping Ma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 54 days.

(21) Appl. No.: 17/152,693

(22) Filed: Jan. 19, 2021

(65) Prior Publication Data

US 2021/0227481 A1 Jul. 22, 2021

Related U.S. Application Data

(60) Provisional application No. 62/963,377, filed on Jan. 20, 2020.

(51) Int. Cl.
*H04W 56/00* (2009.01)
*H04W 68/00* (2009.01)
(Continued)

(52) U.S. Cl.
CPC ....... *H04W 56/005* (2013.01); *H04W 68/005* (2013.01); *H04W 74/0833* (2013.01);
(Continued)

(58) Field of Classification Search
CPC ............. H04W 56/005; H04W 68/005; H04W 74/0833; H04W 76/11; H04W 76/27;
(Continued)

(56) References Cited

U.S. PATENT DOCUMENTS

2018/0083694 A1 3/2018 Rajagopalan et al.
2018/0103419 A1* 4/2018 Lee .................... H04W 72/085
(Continued)

FOREIGN PATENT DOCUMENTS

WO     2006099443 A1   9/2006
WO  WO-2006099443 A1   9/2006
(Continued)

OTHER PUBLICATIONS

Thales, Considerations on satellite beam management, control loops and feeder link switch over, 3GPP TSG-RAN WG1 Meeting #99, Reno, USA, Nov. 18-22, 2019, R1-1913131 (Year: 2019).*
(Continued)

*Primary Examiner* — Shailendra Kumar
(74) *Attorney, Agent, or Firm* — Loza & Loza, LLP; Michael DeHaemer

(57) ABSTRACT

Various aspects relate to adjusting communication timing in response to a switch from one feeder link to another feeder link in a non-terrestrial network. For example, when a satellite moves out of the coverage area of a first ground network entity (or if the first ground network entity is turned off), the satellite switches to a second ground network entity. The resulting switch from a first feeder link for the first ground network entity to a second feeder link for the second ground network entity may cause a timing glitch that adversely affects the UEs under the coverage of the satellite. The disclosure relates in some aspects to sending an indication of the switch and/or a common timing adjust command to all of the UEs affected by the feeder link switch.

22 Claims, 15 Drawing Sheets

(51) Int. Cl.
 *H04W 74/08* (2009.01)
 *H04W 76/11* (2018.01)
 *H04W 76/27* (2018.01)
 *H04W 84/06* (2009.01)

(52) U.S. Cl.
 CPC ............ *H04W 76/11* (2018.02); *H04W 76/27* (2018.02); *H04W 84/06* (2013.01)

(58) Field of Classification Search
 CPC .............. H04W 84/06; H04W 74/004; H04W 56/0045; H04B 7/18504; H04B 7/18519
 See application file for complete search history.

(56) References Cited

U.S. PATENT DOCUMENTS

| | | | |
|---|---|---|---|
| 2018/0249509 A1* | 8/2018 | Yi | H04W 72/1289 |
| 2021/0037484 A1* | 2/2021 | Zhou | H04L 1/1854 |

FOREIGN PATENT DOCUMENTS

| | | | | |
|---|---|---|---|---|
| WO | WO-2020075044 A1 * | 4/2020 | ......... | H04B 7/18519 |
| WO | 2020092561 A1 | 5/2020 | | |
| WO | WO-2020092561 A1 * | 5/2020 | ........... | H04B 7/1851 |
| WO | WO-2020231831 A1 * | 11/2020 | ........ | H04W 56/0045 |

OTHER PUBLICATIONS

Ericsson, PHY aspects of a moving RAN in non-terrestrial networks, 3GPP TSG-RAN WG1 Meeting #97, Reno, USA, May 13-17, 2019, R1-1907433) (Year: 2019).*

Ericsson: "PHY Aspects of a Moving RAN In Non-Terrestrial Networks", 3GPP TSG-RAN WG1 Meeting #97, 3GPP Draft. R1-1907433 PHY Aspects of a Moving RAN in Non-Terrestrial Networks, 3rd Generation Partnership Project (3GPP), Mobile Competence Centre; 650, Route Des Lucioles; F-06921 Sophia Antipolis, vol. RAN WG1, No. Reno, USA; May 13, 2019-May 17, 2019, May 13, 2019 (May 13, 2019), 3 Pages, XP051728865, https://www.3gpp.org/ftp/tsg_ran/WG1_RL1/TSGR1_97/Docs/R1-1907433.zip, [retrieved on May 13, 2019], Section 2.2.

Ericsson (Email Discussion Rapporteur): "[AT112-e] [104] [NTN] Misc CP Issues (Ericsson)", 3GPP Draft; 3GPP TSG-RAN WG2 Meeting #112-e, R2-2010765, 3rd Generation Partnership Project (3GPP), Mobile Competence Centre; 650, Route Des Lucioles; F-06921 Sophia Antipolis, vol. RAN WG2, No. e meeting, Nov. 16, 2020 (Nov. 16, 2020), 19 Pages, XP051955347, Retrieved from the Internet: URL: https://ftp.3gpp.org/tsg_ran/WG2_RL2/TSGR2_112-e/Docs/R2-2010765.zip, R2-2010765_AT112 Email NTN Misc CP_Summary.docx [retrieved on Nov. 16, 2020], Section 2.

International Search Report and Written Opinion—PCT/US2021/014178—ISA/EPO—dated May 25, 2021.

Thales: "Considerations on Satellite Beam Management, Control Loops and Feeder", 3GPP TSG-RAN WG1 Meeting #99, 3GPP Draft; R1-1913131, 3rd Generation Partnership Project (3GPP), Mobile Competence Centre ; 650, Route Des Lucioles , F-06921 Sophiaantipolis Cedex; France, vol. RAN WG1 , No. Reno, USA; Nov. 18, 2019-Nov. 22, 2019, Nov. 8, 2019 (Nov. 8, 2019), pp. 1-14, XP051820320, Retrieved from the Internet: URL: https://www.3gpp.org/ftp/tsg_ran/WG1_RL1/TSGR1_99/Docs/R1-1913131.zip R1-1913131—Considerations on Satellite Beam Management, Control Loops and Feeder link switch over.docx, retrieved on Nov. 8, 2019], Section 4.3.

* cited by examiner

TIMING ADJUST FOR A NON-TERRESTRIAL NETWORK

CROSS-REFERENCE TO RELATED APPLICATIONS

The present application for patent claims priority to and the benefit of U.S. Provisional Application No. 62/963,377, titled "TIMING ADJUST FOR A NON-TERRESTRIAL NETWORK" filed Jan. 20, 2020, and assigned to the assignee hereof and hereby expressly incorporated by reference herein as if fully set forth below in its entirety and for all applicable purposes.

TECHNICAL FIELD

The technology discussed below relates generally to wireless communication and, more particularly, to adjusting timing for a non-terrestrial network.

INTRODUCTION

Next-generation wireless communication systems (e.g., 5GS) may include a 5G core network and a 5G radio access network (RAN), such as a New Radio (NR)-RAN. The NR-RAN supports communication via one or more cells. For example, a scheduled entity such as a user equipment (UE) may access a first cell of a first scheduling entity (e.g., a base station, such as a gNode B (gNB)) and/or access a second cell of a second scheduling entity.

The NR-RAN may be a terrestrial RAN or a non-terrestrial RAN. Non-terrestrial RANs may include airborne or spaceborne vehicles, such as satellites, to support connections between a user equipment (UE) and the core network. For example, non-terrestrial RANs can support connections over trains, boats, and planes and in rural, remote, unserved and/or underserved areas. In some examples, one or more satellites may provide backhaul services between a terrestrial RAN and the core network. In other examples, a satellite may incorporate the functionality of a base station to directly serve a satellite coverage area.

BRIEF SUMMARY OF SOME EXAMPLES

The following presents a summary of one or more aspects of the disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure as a prelude to the more detailed description that is presented later.

In some examples, the disclosure provides a user equipment that includes a transceiver, a memory, and a processor communicatively coupled to the transceiver and the memory. The processor and the memory may be configured to receive at least one message via the transceiver, the at least one message indicating a switch from a first feeder link to a second feeder link for a non-terrestrial network. The processor and the memory may also be configured to adjust timing based on the at least one message indicating the switch from the first feeder link to the second feeder link for the non-terrestrial network. The processor and the memory may be further configured to communicate via the second feeder link according to the timing.

In some examples, the disclosure provides a method for wireless communication at a user equipment. The method may include receiving at least one message indicating a switch from a first feeder link to a second feeder link for a non-terrestrial network. The method may also include adjusting timing based on the at least one message indicating the switch from the first feeder link to the second feeder link for the non-terrestrial network. The method may further include communicating via the second feeder link according to the timing.

In some examples, the disclosure provides a user equipment. The user equipment may include means for receiving at least one message indicating a switch from a first feeder link to a second feeder link for a non-terrestrial network. The user equipment may also include means for adjusting timing based on the at least one message indicating the switch from the first feeder link to the second feeder link for the non-terrestrial network. The user equipment may further include means for communicating via the second feeder link according to the timing.

In some examples, the disclosure provides an article of manufacture for use by a user equipment. The article of manufacture may include a computer-readable medium having stored therein instructions executable by one or more processors of the user equipment to receive at least one message indicating a switch from a first feeder link to a second feeder link for a non-terrestrial network. The computer-readable medium may also have stored therein instructions executable by the one or more processors of the user equipment to adjust timing based on the at least one message indicating the switch from the first feeder link to the second feeder link for the non-terrestrial network. The computer-readable medium may further have stored therein instructions executable by the one or more processors of the user equipment to communicate via the second feeder link according to the timing.

In some examples, the disclosure provides a base station that includes a transceiver, a memory, and a processor communicatively coupled to the transceiver and the memory. The processor and the memory may be configured to communicate with a plurality of user equipment via a first feeder link for a non-terrestrial network. The processor and the memory may also be configured to generate at least one message indicating a switch from the first feeder link to the second feeder link for the non-terrestrial network for the communication with the plurality of user equipment. The processor and the memory may additionally be configured to transmit the at least one message to the plurality of user equipment via the transceiver.

In some examples, the disclosure provides a method for wireless communication at a base station. The method may include communicating with a plurality of user equipment via a first feeder link for a non-terrestrial network. The method may also include generating at least one message indicating a switch from the first feeder link to the second feeder link for the non-terrestrial network for the communicating with the plurality of user equipment. The method may additionally include transmitting the at least one message to the plurality of user equipment.

In some examples, the disclosure provides a base station. The base station may include means for communicating with a plurality of user equipment via a first feeder link for a non-terrestrial network. The base station may also include means for generating at least one message indicating a switch from the first feeder link to the second feeder link for the non-terrestrial network for the communicating with the plurality of user equipment. The base station may additionally include means for transmitting the at least one message to the plurality of user equipment.

In some examples, the disclosure provides an article of manufacture for use by a base station. The article of manufacture may include a computer-readable medium having stored therein instructions executable by one or more processors of the base station to communicate with a plurality of user equipment via a first feeder link for a non-terrestrial network. The computer-readable medium may also have stored therein instructions executable by the one or more processors of the base station to generate at least one message indicating a switch from the first feeder link to the second feeder link for the non-terrestrial network for the communication with the plurality of user equipment. The computer-readable medium may additionally have stored therein instructions executable by the one or more processors of the base station to transmit the at least one message to the plurality of user equipment.

These and other aspects of the disclosure will become more fully understood upon a review of the detailed description, which follows. Other aspects, features, and examples of the present disclosure will become apparent to those of ordinary skill in the art, upon reviewing the following description of specific, example aspects of the present disclosure in conjunction with the accompanying figures. While features of the present disclosure may be discussed relative to certain examples and figures below, all examples of the present disclosure can include one or more of the advantageous features discussed herein. In other words, while one or more examples may be discussed as having certain advantageous features, one or more of such features may also be used in accordance with the various examples of the disclosure discussed herein. In similar fashion, while example aspects may be discussed below as device, system, or method examples it should be understood that such example aspects can be implemented in various devices, systems, and methods.

DETAILED DESCRIPTION

Figure 1:
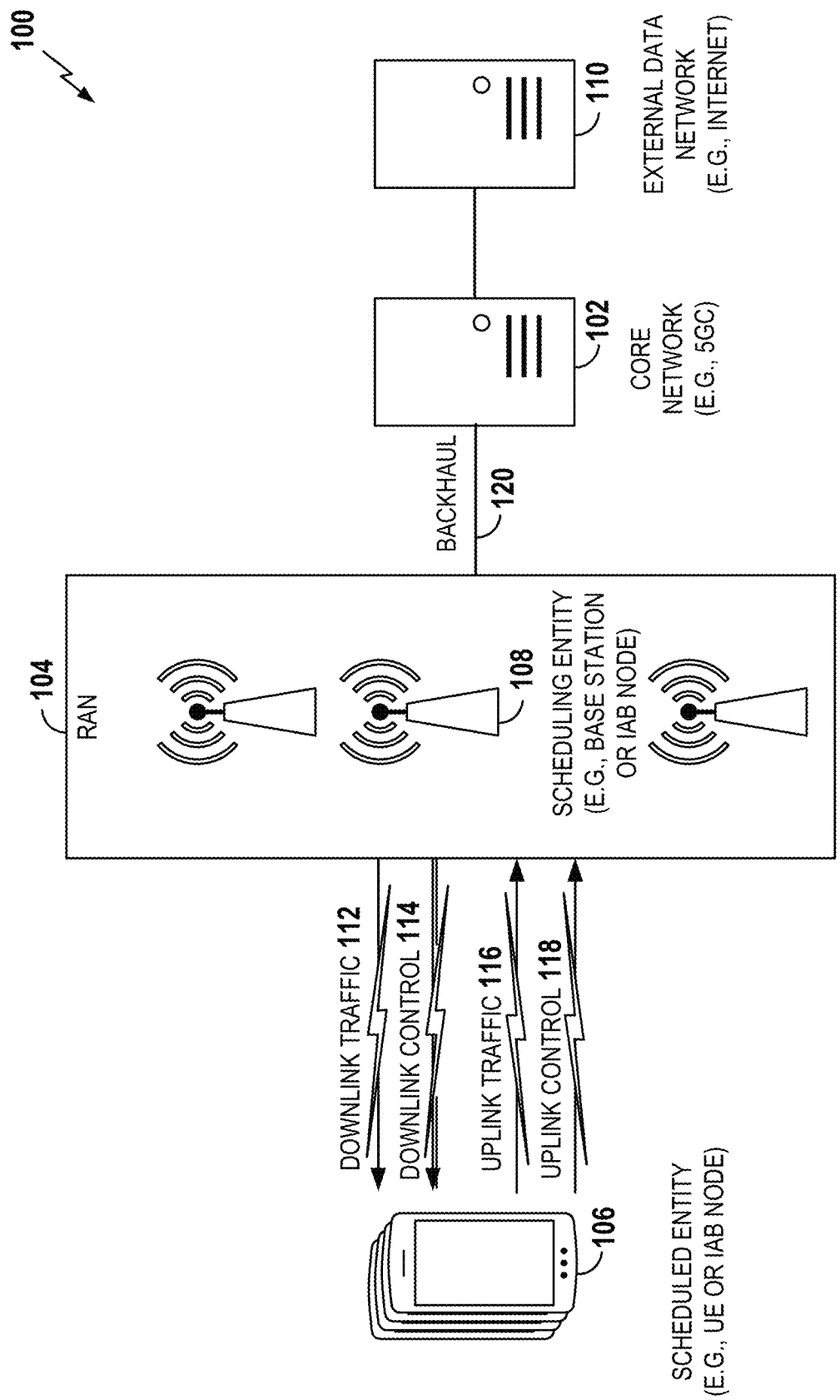
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts. Additionally, well-known elements will not be described in detail or will be omitted so as not to obscure the relevant details of the disclosure.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, artificial intelligence-enabled (AI-enabled) devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Various aspects of the disclosure relate to adjusting timing in response to a switch from one feeder link to another feeder link in a non-terrestrial network. For example, a set of UEs may initially communicate with a first ground network (including a base station) via a satellite that is connected to the first ground network via a first feeder link.

When the satellite moves out of the coverage area of the first ground network (or if the first ground network is turned off), the satellite switches to a second ground network. This switch may cause a timing glitch. For example, the timings of the first and second ground networks may be relatively asynchronous (e.g., not tightly synchronized). As another example, the propagation delay between the satellite and a base station of the second ground network may be different than the propagation delay that existed between the satellite and the base station of the first ground network. This timing glitch may affect the UEs under the coverage of the satellite. The disclosure relates in some aspects to sending a common timing adjust (e.g., timing advance) command to all of the UEs affected by the feeder link switch. Here, since the change in timing (due to the feeder link switch) that affects the UEs under the satellite will be the same, a common timing adjust command is broadcast to the UEs rather than sending individual timing adjust commands to each UE. Thus, timing in the system can be adjusted more efficiently through the use of the common timing adjust command.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and at least one scheduled entity 106. The at least one scheduled entity 106 may be referred to as a user equipment (UE) 106 in the discussion that follows. The RAN 104 includes at least one scheduling entity 108. The at least one scheduling entity 108 may be referred to as a base station (BS) 108 in the discussion that follows. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long-Term Evolution (LTE). The 3GPP refers to this hybrid RAN as a next-generation RAN, or NG-RAN. In another example, the RAN 104 may operate according to both the LTE and 5G NR standards. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations 108 may be an LTE base station, while another base station may be a 5G NR base station.

The radio access network 104 is further illustrated supporting wireless communication for multiple mobile apparatuses. A mobile apparatus may be referred to as user equipment (UE) 106 in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE 106 may be an apparatus that provides a user with access to network services. In examples where the RAN 104 operates according to both the LTE and 5G NR standards, the UE 106 may be an Evolved-Universal Terrestrial Radio Access Network—New Radio dual connectivity (EN-DC) UE that is capable of simultaneously connecting to an LTE base station and a NR base station to receive data packets from both the LTE base station and the NR base station.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A mobile apparatus may additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In some examples, the term downlink may refer to a point-to-multipoint transmission originating at a scheduling entity (described further below; e.g., base station 108). Another way to describe this point-to-multipoint transmission scheme may be to use the term broadcast channel multiplexing. Transmissions from a UE (e.g., UE 106) to a base station (e.g., base station 108) may be referred to as uplink (UL) transmissions. In some examples, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 and/or uplink control information 118 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols in some examples. A subframe may refer to a duration of 1 millisecond (ms). Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
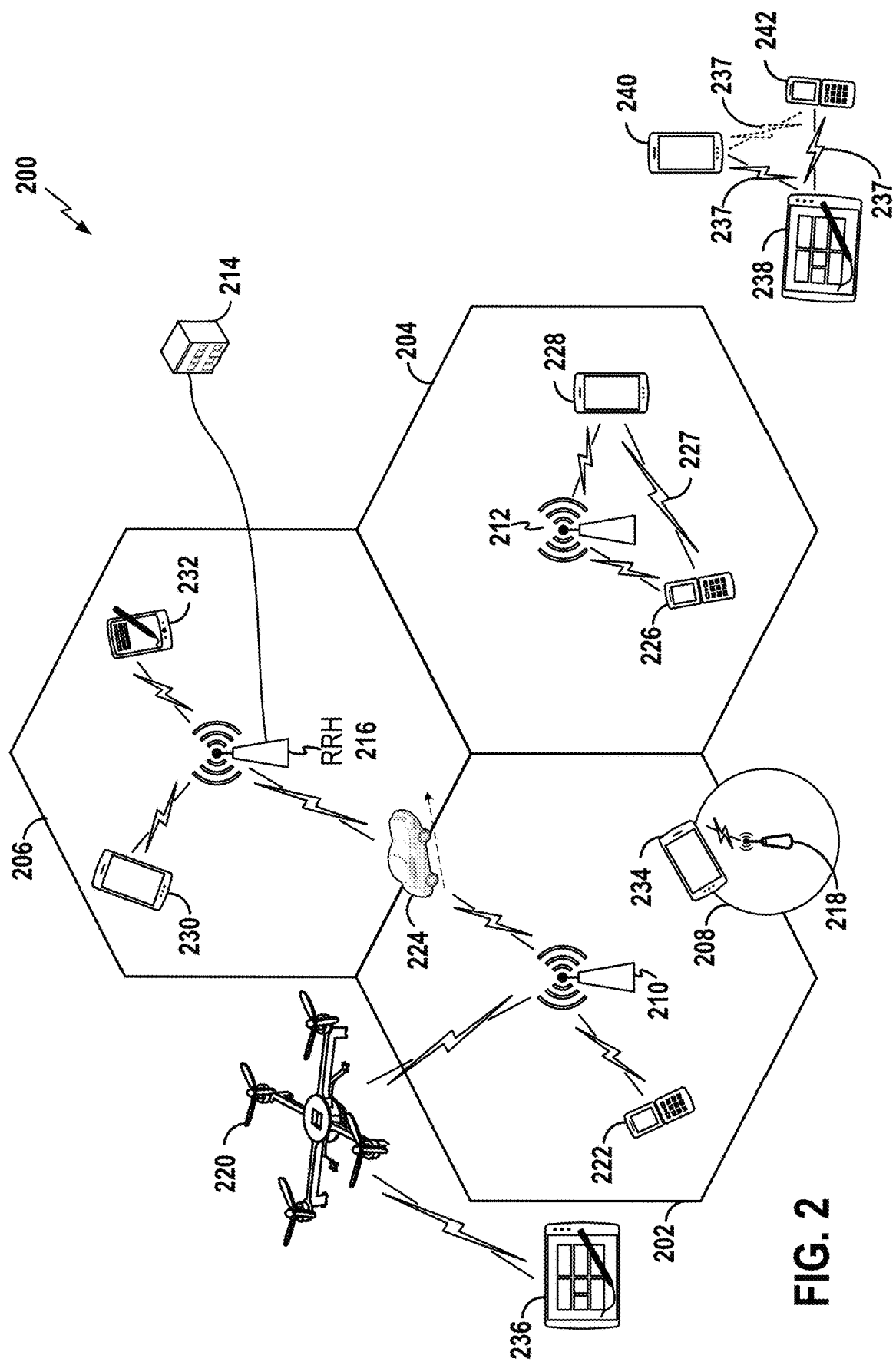
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 236, 238, 240, and/or 242 may be the same as the UE/scheduled entity 106 described above and illustrated in FIG. 1.

In some examples, an unmanned aerial vehicle (UAV) 220, which may be a drone or quadcopter, can be a mobile network node and may be configured to function as a UE. For example, the UAV 220 may operate within cell 202 by communicating with base station 210. In some examples, a UAV 220 may be configured to function as a BS (e.g., serving the UE 236). That is, in some examples, a cell may not necessarily be stationary, and the geographic area of the cell may move according to the location of a mobile base station such as a UAV 220.

In a further aspect of the RAN 200, sidelink signals may be used between UEs without necessarily relying on scheduling or control information from a base station. For example, two or more UEs (e.g., UEs 238, 240, and 242) may communicate with each other using peer to peer (P2P) or sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication. In either case, such sidelink signaling 227 and 237 may be implemented in a P2P network, a device-to-device (D2D) network, vehicle-to-vehicle (V2V) network, a vehicle-to-everything (V2X), a mesh network, or other suitable direct link network. In some examples, the sidelink signals 227 and 237 include sidelink traffic (e.g., a physical sidelink shared channel) and sidelink control (e.g., a physical sidelink control channel).

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

A radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of the serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without the need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may further utilize one or more duplexing algorithms Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancelation technologies. Full-duplex emulation is frequently implemented for wireless links by utilizing frequency division duplex (FDD) or spatial division duplex (SDD). In FDD, transmissions in different directions operate at different carrier frequencies. In SDD, transmissions in different directions on a given channel are separate from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to as sub-band full-duplex (SBFD), also known as flexible duplex.

Figure 3:
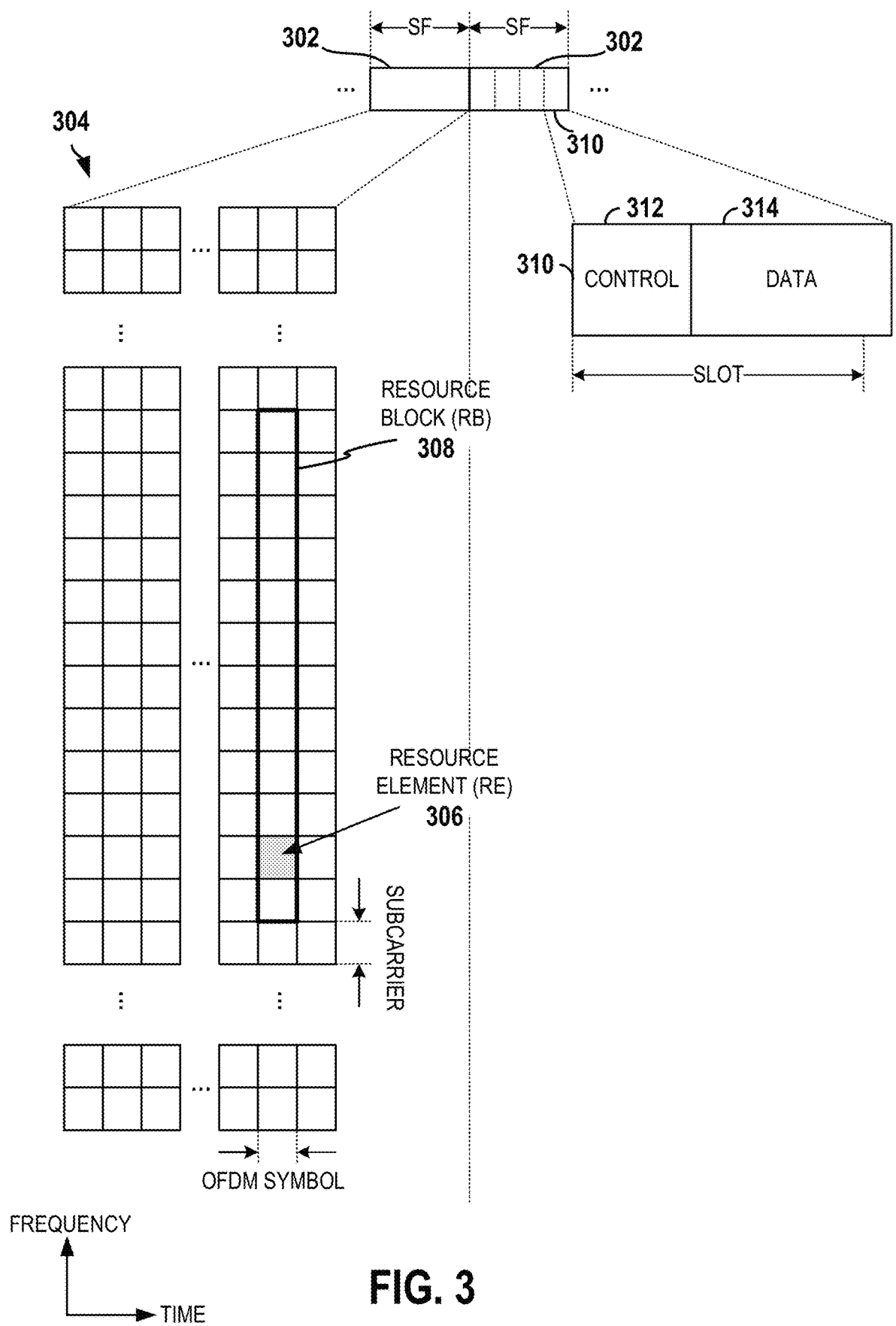
FIG. 3 is a schematic diagram illustrating organization of wireless resources in an air interface utilizing orthogonal frequency divisional multiplexing (OFDM) according to some aspects.

Various aspects of the present disclosure will be described with reference to an OFDM waveform, an example of which is schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Referring now to FIG. 3, an expanded view of an example subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

Scheduling of UEs or sidelink devices (hereinafter collectively referred to as UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE/sidelink device implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 13 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is an example, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

A base station may pre-configure an uplink resource that can be used by a UE (e.g., an IoT device, a reduced capability UE, a regular UE, etc.) to transmit a small data transmission (SDT) and the like. For example, a UE operating in an inactive mode or an idle mode that has data to transmit to the base station may request the base station to pre-configure an uplink resource for the uplink transmission. In response, the base station may transmit a configuration to the UE that identifies a particular pre-configured uplink resource (e.g., on a physical uplink shared channel). The UE may transmit uplink data on the pre-configured uplink resource (e.g., during a specified slot or slots) without establishing a connection to a base station (e.g., without switching to a connected mode). After receiving the uplink data, the base station may send an acknowledgement to the UE indicating whether the uplink data was successfully received (e.g., according to a HARQ procedure). Through the use of such a pre-configured uplink resource (PUR), the UE may use less signaling overhead and/or processing overhead for an uplink transmission as compared to an uplink transmission during a connected mode (e.g., that involves a more signaling intensive resource scheduling procedure).

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 30, 80, or 130 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional (remaining) system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above with reference to FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 4:
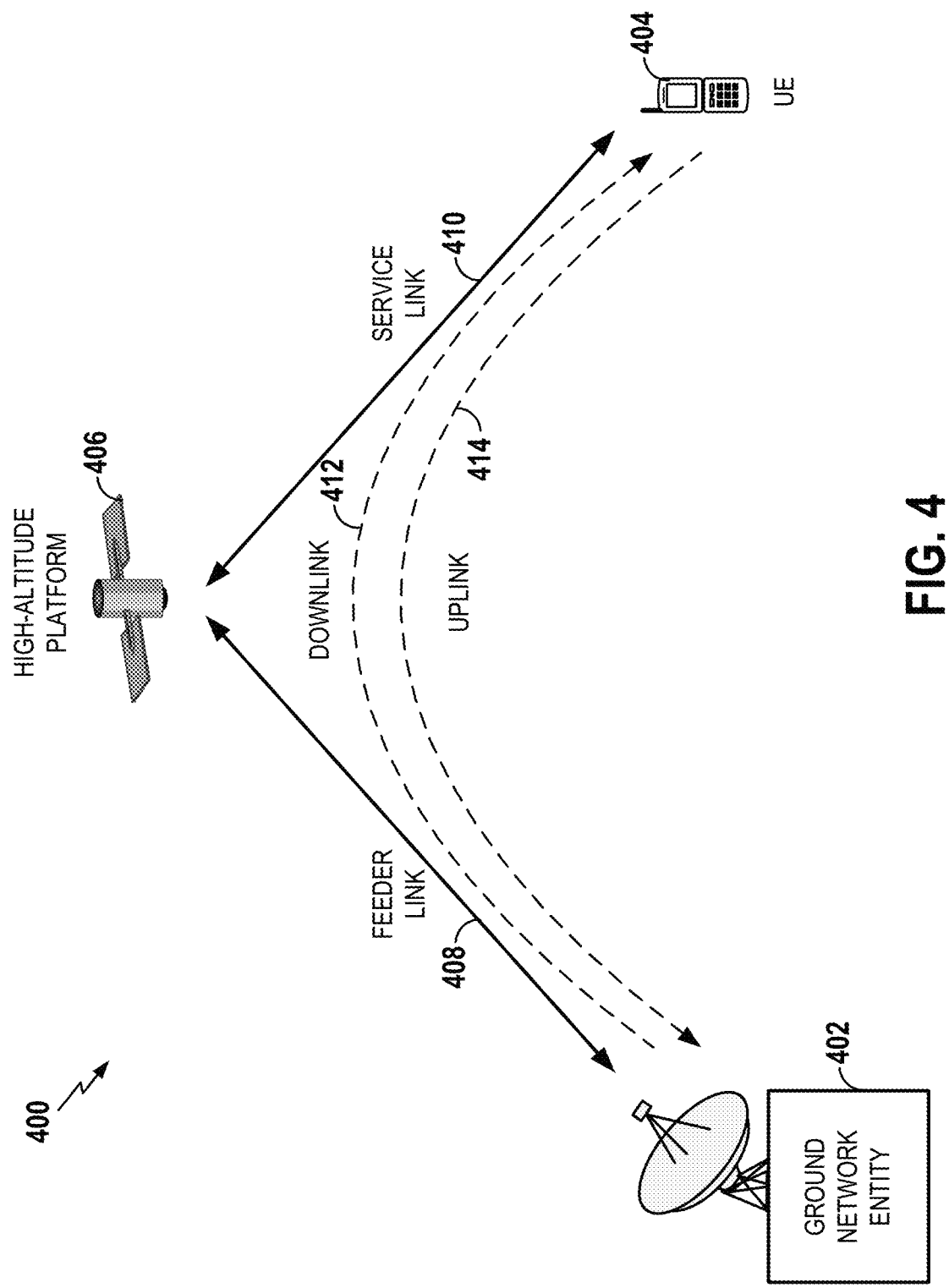
FIG. 4 is a block diagram illustrating an example non-terrestrial communication system according to some aspects.

FIG. 4 illustrates an example of a non-terrestrial network 400 where a ground network (GN) entity 402 communicates with a user equipment (UE) via a high-altitude platform 406. For example, the UE 404 may communicate with a transmit-receive point (e.g., a base station, not shown) of the ground network entity 402 using wireless communication resources managed by the base station and/or other network components (not shown in FIG. 4). The high-altitude platform 406 may be a satellite, a drone, an aircraft, or some other type of airborne entity.

The high-altitude platform 406 communicates with the ground network entity 402 via a feeder link 408 and communicates with the UE 404 via a service link 410. Communication of information between the ground network entity 402 and the UE 404 may involve sending information via a downlink 412, sending information via an uplink 414, or the like. For example, a base station of the ground network entity 402 may schedule and send downlink (DL) information to the UE 404 (and to other UEs not shown in FIG. 4) and the base station may schedule the UE 404 (and other UEs) to send uplink (UL) information to the ground network.

As mentioned above, a feeder link is the link between the ground network (GN) and a satellite in a satellite-based NTN system. A feeder link switch occurs when a satellite passes the boundary defined by two GNs or when a GN is turned off. During feeder link switch, a timing glitch can occur due to the following reasons: 1) the timings of the two GNs may be asynchronized; and/or 2) the propagation delay difference between the two feeder links may not be properly accounted for.

The timing glitch can affect a large number of UEs that are under the coverage of the satellite going through feeder link switch. Depending on the magnitude of the timing glitch, the timing glitch can cause a connection quality degradation or loss of connection. Here, a large number of UEs transmitting PRACH preambles may collide at the base station (e.g. a gNB) of the ground network, resulting in a long period of connection interruption.

Thus, in FIG. 4, a timing glitch may occur if the high-altitude platform 406 (e.g., a non-geosynchronous satellite) moves out of the coverage area of the ground network entity 402 or if the ground network entity 402 is turned off. The ground network entity 402 and the UE may include functionality as discussed in more detail below to efficiently address the timing glitch.

Figure 5:
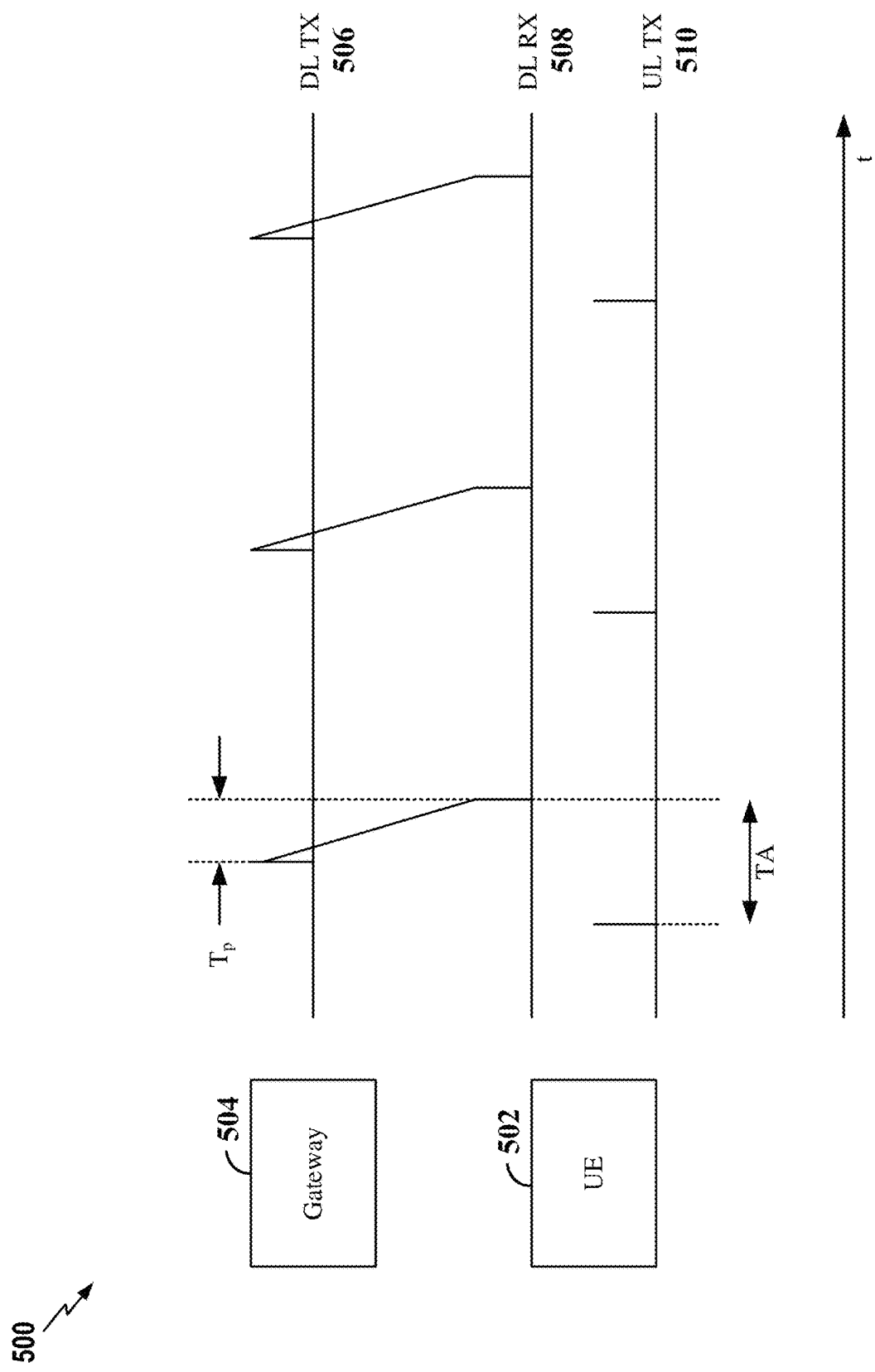
FIG. 5 is a diagram illustrating an example of a timing advance according to some aspects.

Due to the relatively long distance from a ground network to a satellite, timing delays and associated timing issues may adversely affect user service in such a network. FIG. 5 illustrates an example of time synchronization in a network such as the network 400 of FIG. 4. In the example shown in FIG. 5, a UE 502 is in wireless communication with a gateway 504 over a satellite link. The UE 502 may correspond to any of the scheduled entities or UEs shown in any of 1, 2, 4, 6, 7, 8, and 9. The gateway 504 may correspond to any of the scheduling entities or base stations shown in any of 1, 2, 4, 6, 7, 8, and 12. The downlink reception timing (DL RX) 508 of the UE 502 in relation to the downlink transmission timing (DL TX) 506 of the gateway 504 over a period of time (t) is shown in FIG. 5. As can be seen in the example of FIG. 5, there is a propagation delay ($T_p$) between the DL TX 506 and DL RX 508. The propagation delay ($T_p$) is representative of the over-the-air transmission time of packets transmitted from the gateway 504 to the UE 502.

FIG. 5 further illustrates the uplink transmission timing (UL TX) 510 of uplink signals transmitted from the UE 502 to the gateway 504. The UL TX 510 of the UE 502 may be adjusted based on a timing advance (TA) command including a TA value received from the gateway 504. The TA value is indicative of a round-trip time (RTT) of communication between the gateway 504 and the UE 502. For example, the RTT may be equal to twice the propagation delay ($T_p$). In some examples, the gateway 504 may estimate the RTT based on uplink signals, such as random access signals, received from the UE 502. For example, the UE 502 may transmit a random access preamble message to the gateway 504. From the random access preamble message, the gateway 504 may estimate the RTT and convey the TA command to the UE 502 within a random access response message.

The UE 502 may adjust the UL TX 510 based on the DL RX 508 and the TA value. For example, the UE 502 may set the UL TX 510 based on the difference between the DL RX 508 and the TA value. The UE 502 may continually track the DL RX 508 and adjust the UL TX 510 based on the DL RX 508 and the current TA value.

Figure 6:
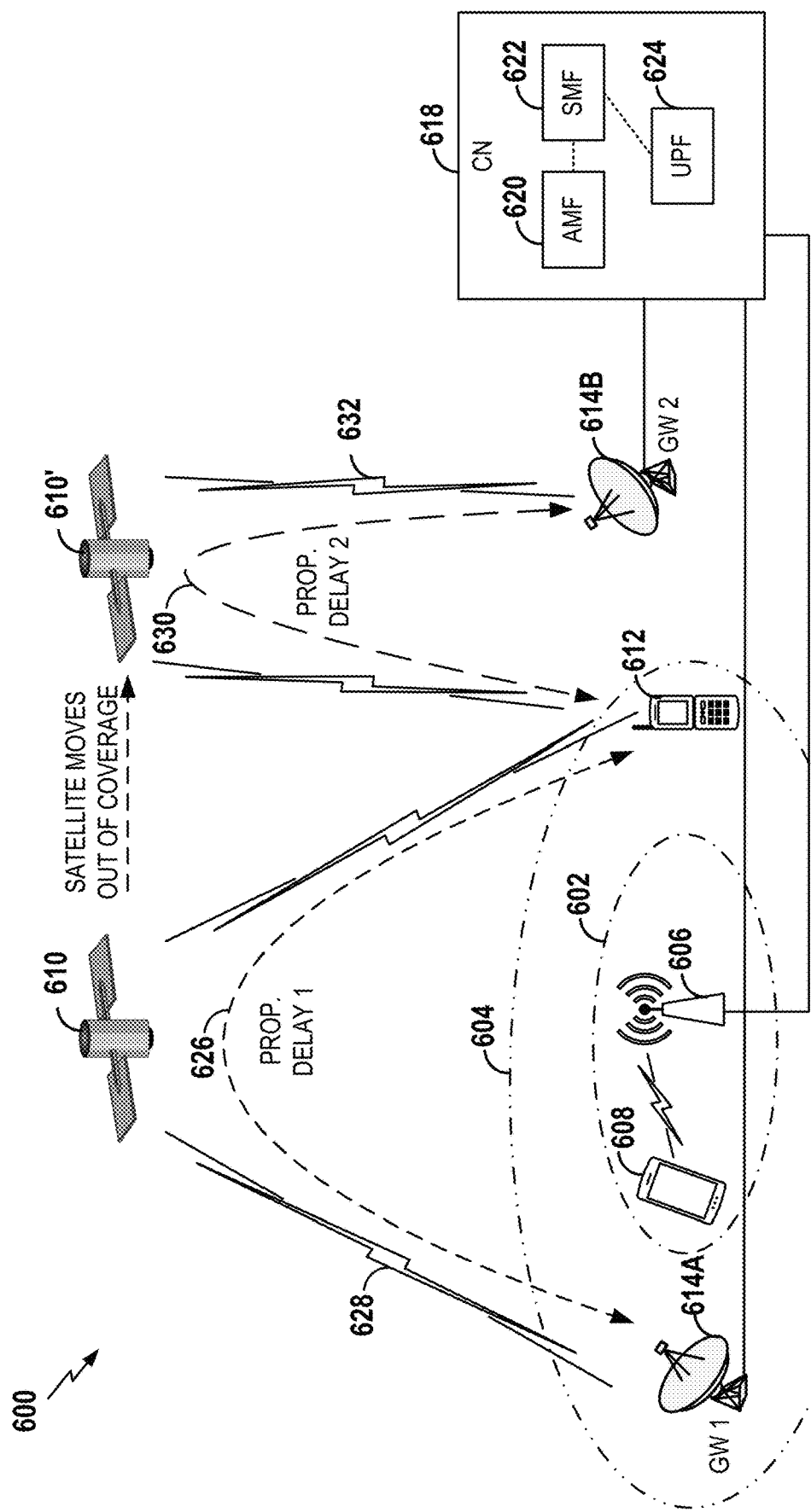
FIG. 6 is a block diagram illustrating an example communication system where a UE communicates with a network via a satellite according to some aspects.

As discussed in more detail in conjunction with FIG. 6, a change in feeder link may result in a change in the propagation delay between the UE and the gateway. This change in propagation delay may therefore trigger a change in the timing advance used by the UE.

FIG. 6 illustrates an example of wireless communication system 600 where a UE communicates with a network via a satellite. The wireless communication system 600 includes a terrestrial RAN 602 and a non-terrestrial RAN 604. The wireless communication system 600 may be a 5G wireless communication system (5GS), which may correspond to, for example, the network 400 illustrated in FIG. 4. The terrestrial RAN 602 may correspond, for example, to the RAN 300 illustrated in FIG. 3. For example, the terrestrial RAN 602 may include one or more base stations 606 (one of which is shown for convenience), each serving one or more UEs 608. The terrestrial RAN 602 may further be coupled to a core network (CN) 618 for communication of user plane and control plane signaling and data.

The non-terrestrial RAN 604 may include one or more satellites (e.g., a single satellite 610 is shown for convenience) for serving one or more UEs 612 within a satellite coverage area. The UE(s) 612 may correspond at least in some aspect to, for example, the UE 404 of FIG. 4. In some examples, the satellite coverage area may include one or more fixed tracking areas (TAs), each including one or more cells (not shown) served by the satellite 610. Each cell may be defined with respect to a fixed or moving satellite beam spot, depending on the type of satellite. For example, the satellite 610 may be a low earth orbit (LEO) satellite, a medium earth orbit (MEO) satellite, or a geostationary earth orbit (GEO) satellite. LEO satellites may orbit the Earth with an altitude between 300 kilometers (km) and 2,000 km and produce a beam footprint size between 100 km and 500 km. MEO satellites may orbit the Earth with an altitude between 8,000 km and 25,000 km and produce a beam footprint size between 100 km and 500 km. GEO satellites may orbit the Earth with an altitude of 35,786 km and produce a beam footprint size between 200 and 1,000 km.

The non-terrestrial RAN 604 further includes satellite gateways (or Earth stations) to relay control plane and user plane communication between the satellite 610 and the CN 618. The satellite gateways may correspond at least in some aspect to, for example, the ground network entity 402 of FIG. 4. For convenience, two gateways 614A and 614B are shown in FIG. 6. In some examples, the satellite 610 may route communication to/from the satellite gateway 614 through one or more additional satellites 610b via inter-satellite links (ISLs).

The core network 618 may include, for example, an access management function (AMF) 620, a session management function (SMF) 622, and a user plane function (UPF) 624. The core network 618 may further include other functions, such as a policy control function (PCF), authentication server function (AUSF), and other functions (not illustrated, for simplicity). The AMF 620 and SMF 622 employ control plane (e.g., Non Access Stratum (NAS)) signaling to perform various functions related to mobility management and session management for a UE. For example, the AMF 620 provides connectivity, mobility management and authentication of the UE, while the SMF 622 provides session management of the UE (e.g., processes signaling related to protocol data unit (PDU) sessions between the UE and an external data network). The UPF 624 provides user plane connectivity to route 5G (NR) packets to/from the UE via the NR-RAN.

To establish a connection to the 5G core network via the NR-RAN, the UE may transmit a registration request and PDU session establishment request to the 5G core network via the NR-RAN. The AMF 620 and SMF 622 may process the registration request and PDU session establishment request and establish a data network session (DNS) between the UE and the external data network via the UPF 624. A DNS may include one or more sessions (e.g., data sessions or data flows) and may be served by multiple UPFs 624 (only one of which is shown for convenience). Examples of data flows include, but are not limited to, IP flows, Ethernet flows and unstructured data flows.

The UPF 624 may be configured to provide user plane connectivity to route PDUs (or packets) to/from the UEs 608 and 612 via the RANs 602 and 604. The AMF 620 and SMF 622 may be configured to provide control plane connectivity to perform NAS signaling with each of the UEs 608 and 612 via the RANs 602 and 604. For example, the AMF 620 may perform various mobility management procedures, such as registration and service request procedures, with the UEs 608 and 612, while the SMF 622 may perform various session management procedures, such as PDU session establishment, PDU session modification, and PDU session release procedures, with the UEs 608 and 612 via the AMF 620.

As discussed above, the UE 612 (and other UEs, not shown in FIG. 6) may initially communicate with the gateway 614A (e.g., a first ground network). However, after the satellite 610 moves (as represented by satellite 610') out of the coverage range of the gateway 614A, the UE(s) may subsequently communicate with the gateway 614B (e.g., a second ground network). This change in gateways involves a change in feeder links as discussed above. As a result, the propagation delay between the UE(s) and the core network 618 may have changed. For example, a first propagation delay 626 associated with a first feeder link 628 to the gateway 614A may be different from a second propagation delay 630 associated with a second feeder link 632 to the gateway 614B. In accordance with the teachings herein, the network may change the timing advance used by the UE(s) to address this change in propagation delay.

Figure 7:
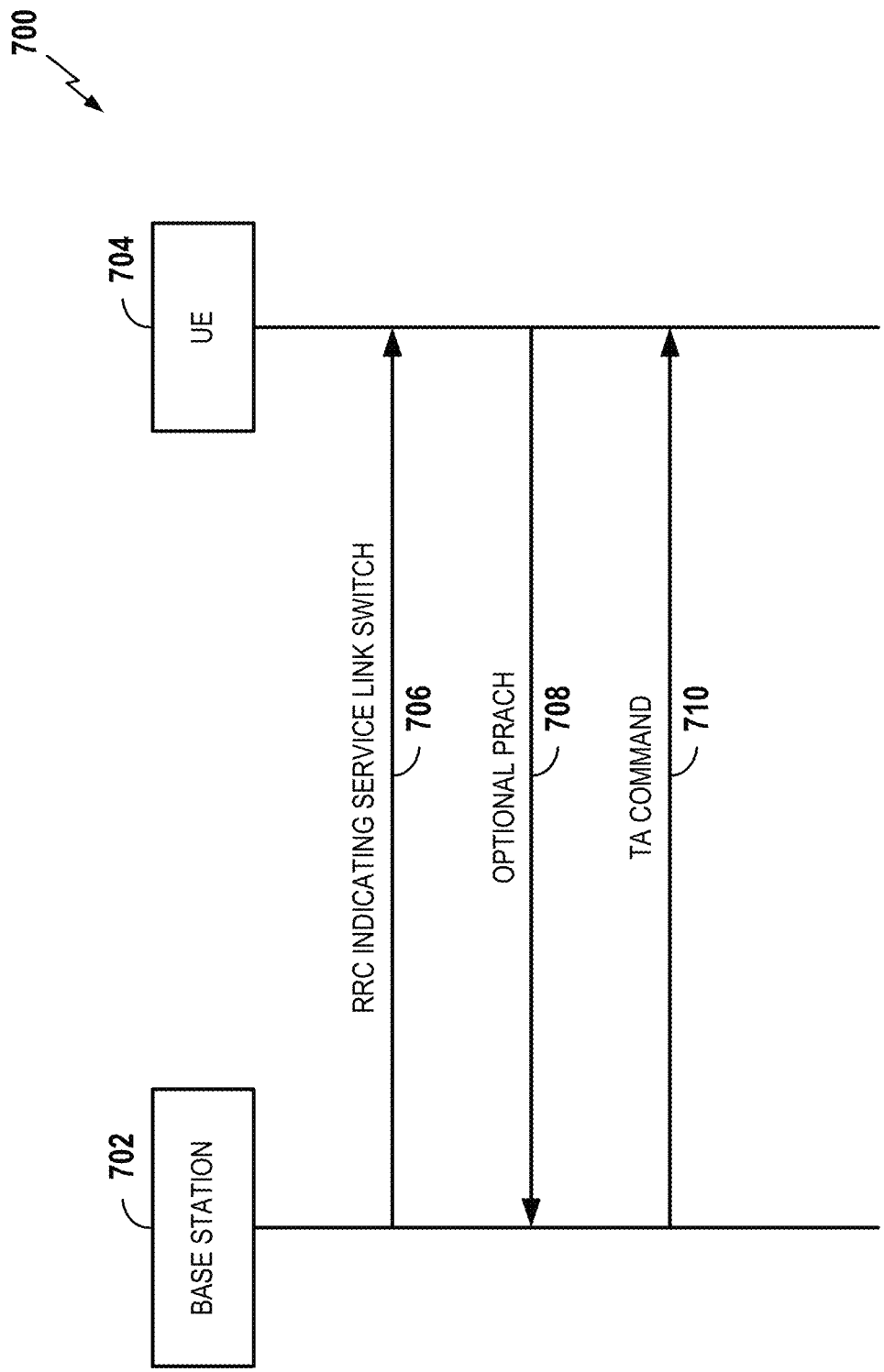
FIG. 7 is a block diagram illustrating an example communication system that uses a timing adjust (e.g., timing advance) command according to some aspects.

FIG. 7 is a schematic illustration of a wireless communication system 700 that that uses a timing adjust (e.g., timing advance) command according to some aspects. The wireless communication system 700 shown in FIG. 7 includes a base station 702 and a UE 704. The base station 702 may correspond to any of the scheduling entities or base stations shown in any of 1, 2, 4, 5, 6, 8, and 12. The UE 704 may correspond to any of the scheduled entities or UEs shown in any of 1, 2, 4, 5, 6, 8, and 9.

The base station 702 may control communications with (e.g. transmitting to and/or receiving from) the UE 704 and/or other apparatuses via a transceiver and one or more satellites (not shown in FIG. 7 for convenience). For example, the base station 702 may set up and tear down links (e.g., service links to a satellite). In addition, the base station 702 may also monitor the links to determine whether communication will switch to another link (e.g., the base station 702 may determine whether a satellite is moving out of the coverage area of the base station 702). The base station 702 may also generate messages to be sent by the base station 702 and process messages received by the base station 702. For example, the base station 702 may generate RRC messages 706, TA commands 710, and other messages as taught herein, and transmit those messages to the UE 704 and/or other apparatuses.

The base station 702 may generate timing advance information to be sent to the UE 704 and other similar apparatuses (e.g., UEs). For example, the base station 702 may analyze the timing of PRACH preambles 708 received by the base station 702 to determine a TA value to be sent via the TA command 710.

The UE 704 may control communications with (e.g. transmitting to and/or receiving from) the base station 702 and/or other apparatus via a transceiver and one or more satellites (not shown in FIG. 7 for convenience). For example, the UE 704 may generate messages to be sent by the UE 704 and process messages received by the UE 704. For example, the UE 704 may receive and process the RRC messages 706, the TA commands 710, and other messages as taught herein transmitted by the base station 702.

The UE 704 may also adjust the timing of the UE 704 used for communication with the base station 702. For example, the UE 704 may adjust a TA parameter based on a TA value received from the base station 702 via the TA command 710.

Figure 8:
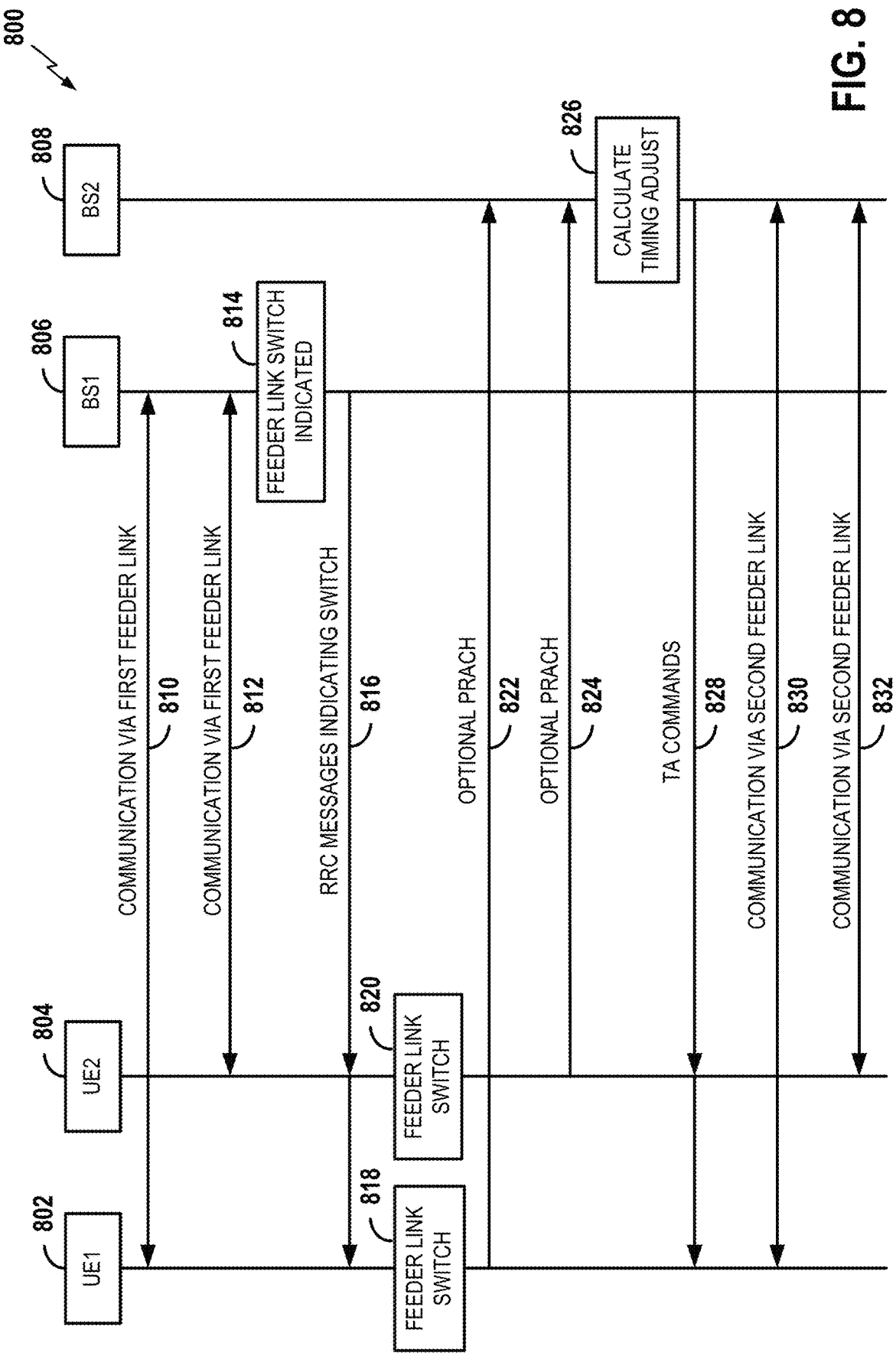
FIG. 8 is a signaling diagram illustrating an example of a feeder switch process according to some aspects.

FIG. 8 is a signaling diagram 800 illustrating an example of a feeder switch process according to some aspects. In FIG. 8, a wireless communication system includes a first UE 802, a second UE 804, a first base station (BS) 806 and a second base station (BS) 808 in accordance with some aspects of the disclosure. The first base station 806 and the second base station 808 may correspond to any of the scheduling entities or base stations shown in any of 1, 2, 4, 5, 6, 7, and 12. The first UE 802 and the second UE 804 may correspond to any of the scheduled entities or UEs shown in any of 1, 2, 4, 5, 6, 7, and 9.

At reference 810, the first BS 806 communicates with the first UE 802 via a first feeder link between the first BS and a high-altitude platform (e.g., a satellite) of an NTN and via a service link between the high-altitude platform and the UEs. In addition, at reference 812, the first BS 806 communicates with the second UE 804 via the first feeder link between the first BS and the high-altitude platform (e.g., a satellite) of the NTN and via a service link between the high-altitude platform and the UEs.

At reference 814, the first BS 806 determines that the communication will switch to the second BS 808 (i.e., the connection with the network will switch from the first feeder link to a second feeder link between the second BS 808 and the high-altitude platform).

At reference 816, the first BS 806 transmits an RRC message to each of the first UE 802 and the second UE 804 indicating a feeder link switch (e.g., the RRC message specifies a switch wait period, and specifies PRACH configuration parameters for one or more of the UEs that are to send a PRACH preamble via the second feeder link).

At reference 818 and reference 820, the feeder link switch occurs at each of the first UE 802 and the second UE 804 (i.e., UE communication with the network will subsequently go through the second feeder link).

At optional reference 822, the second BS 808 may receive PRACH preamble(s) from the first UE 802 via the second feeder link. Similarly, at optional reference 824, the second BS 808 may receive PRACH preamble(s) from the second UE 804 via the second feeder link.

At reference 826, the second BS 808 calculates a TA due to the feeder link switch (e.g., an incremental TA value or an absolute TA value) for each of the first UE 802 and the second UE 804.

At reference 828, the second BS 808 sends a TA command including the calculated TA to each of the first UE 802 and the second UE 804. In response, each of the first UE 802 and the second UE 804 may adjust its timing for communication with the BS 808. For example, the UE 802 may adjust a first TA parameter based on a first TA value received from the BS 808. Similarly, the UE 804 may adjust a second TA parameter based on a second TA value received from the BS 808.

At reference 830, the second BS 808 communicates with the first UE 802 via the second feeder link and via a service link between the high-altitude platform and the UEs. Similarly, at reference 832, the second BS 808 communicates with the second UE 804 via the second feeder link and via a service link between the high-altitude platform and the UEs.

Figure 9:
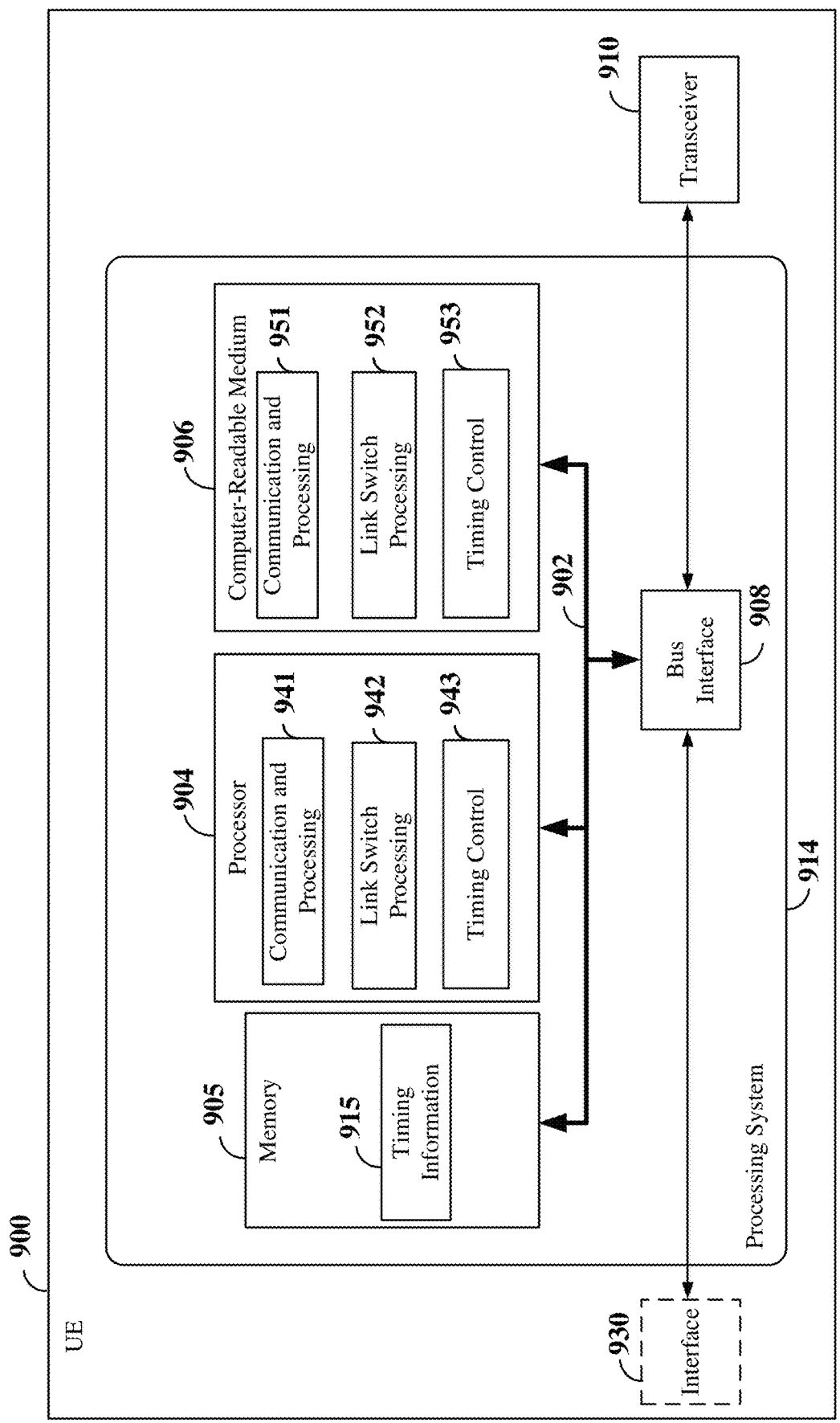
FIG. 9 is a block diagram illustrating an example of a hardware implementation for a user equipment employing a processing system according to some aspects.

FIG. 9 is a block diagram illustrating an example of a hardware implementation for a UE 900 employing a processing system 914. For example, the UE 900 may be a device configured to wirelessly communicate with a base station, as discussed in any one or more of FIGS. 1-8. In some implementations, the UE 900 may correspond to any of the UEs or scheduled entities shown in any of FIGS. 1, 2, 4, 5, 6, 7, and 8.

In accordance with various aspects of the disclosure, an element, or any portion of an element, or any combination of elements may be implemented with the processing system 914. The processing system 914 may include one or more processors 904. Examples of processors 904 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 900 may be configured to perform any one or more of the functions described herein. That is, the processor 904, as utilized in a UE 900, may be used to implement any one or more of the processes and procedures described herein.

The processor 904 may in some instances be implemented via a baseband or modem chip and in other implementations, the processor 904 may include a number of devices distinct and different from a baseband or modem chip (e.g., in such scenarios as may work in concert to achieve the examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 914 may be implemented with a bus architecture, represented generally by the bus 902. The bus 902 may include any number of interconnecting buses and bridges depending on the specific application of the processing system 914 and the overall design constraints. The bus 902 communicatively couples together various circuits including one or more processors (represented generally by the processor 904), a memory 905, and computer-readable media (represented generally by the computer-readable medium 906). The bus 902 may also link various other circuits such as timing sources, peripherals, voltage regulators, and power management circuits, which are well known in the art, and therefore, will not be described any further. A bus interface 908 provides an interface between the bus 902 and a transceiver 910 and between the bus 902 and an interface 930. The transceiver 910 provides a communication interface or means for communicating with various other apparatus over a wireless transmission medium. In some examples, the UE may include two or more transceivers 910, each configured to communicate with a respective network type (e.g., terrestrial or non-terrestrial). The interface 930 provides a communication interface or means of communicating with various other apparatuses and devices (e.g., other devices housed within the same apparatus as the UE or other external apparatuses) over an internal bus or external transmission medium, such as an Ethernet cable. Depending upon the nature of the apparatus, the interface 930 may include a user interface (e.g., keypad, display, speaker, microphone, joystick). Of course, such a user interface is optional, and may be omitted in some examples, such as an IoT device.

The processor 904 is responsible for managing the bus 902 and general processing, including the execution of software stored on the computer-readable medium 906. The software, when executed by the processor 904, causes the processing system 914 to perform the various functions described below for any particular apparatus. The computer-readable medium 906 and the memory 905 may also be used for storing data that is manipulated by the processor 904 when executing software. For example, the memory 905 may store timing information 915 (e.g., timing adjust information) used by the processor 904 in cooperation with the transceiver 910 for communicating data.

One or more processors 904 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 906.

The computer-readable medium 906 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 906 may reside in the processing system 914, external to the processing system 914, or distributed across multiple entities including the processing system 914. The computer-readable medium 906 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The UE 900 may be configured to perform any one or more of the operations described herein (e.g., as described above in conjunction with FIGS. 1-8 and as described below in conjunction with FIGS. 10 and 11). In some aspects of the disclosure, the processor 904, as utilized in the UE 900, may include circuitry configured for various functions.

The processor 904 may include communication and processing circuitry 941. The communication and processing circuitry 941 may be configured to communicate with a base station, such as a gNB. The communication and processing circuitry 941 may include one or more hardware components that provide the physical structure that performs various processes related to wireless communication (e.g., signal reception and/or signal transmission) as described herein. The communication and processing circuitry 941 may further include one or more hardware components that provide the physical structure that performs various processes related to signal processing (e.g., processing a received signal and/or processing a signal for transmission) as described herein. In some examples, the communication and processing circuitry 941 may include two or more transmit/receive chains, each configured to process signals in a different RAT (or RAN) type. The communication and processing circuitry 941 may further be configured to execute communication and processing software 951 included on the computer-readable medium 906 to implement one or more functions described herein.

In some examples, the communication and processing circuitry 941 may be configured to receive and process downlink beamformed signals at a mmWave frequency or a sub-6 GHz frequency via the transceiver 910 and an antenna array. For example, the communication and processing circuitry 941 may be configured to receive a respective reference signal (e.g., SSB or CSI-RS) on each of a plurality of downlink beams from the base station during a downlink beam sweep via at least one first antenna panel of the antenna array 920. The communication and processing circuitry 941 may further be configured to transmit a beam measurement report to the base station.

In some examples, the communication and processing circuitry 941 may further be configured to generate and transmit uplink beamformed signals at a mmWave frequency or a sub-6 GHz frequency via the transceiver 910. For example, the communication and processing circuitry 941 may be configured to transmit a respective reference signal (e.g., SRS or DMRS) on each of a plurality of uplink beams to the base station during an uplink beam sweep via at least one second antenna panel of the antenna array 920.

The communication and processing circuitry 941 may further be configured to generate and transmit a request to the base station. For example, the request may be included in a MAC-CE carried in a PUSCH, UCI in a PUCCH or PUSCH, a random access message, or an RRC message. The communication and processing circuitry 941 may further be configured to generate and transmit a scheduling request (e.g., via UCI in a PUCCH) to the base station to receive an uplink grant for the PUSCH carrying the MAC-CE including the request.

The communication and processing circuitry 941 may further be configured to generate and transmit an uplink signal on one or more uplink transmit beams applied to the uplink signal. The uplink signal may include, for example, a PUCCH, PUSCH, SRS, DMRS, or PRACH.

The communication and processing circuitry 941 may further be configured to control the antenna array 920 and the transceiver 910 to search for and identify a plurality of downlink transmit beams during a downlink beam sweep. The communication and processing circuitry 941 may further be configured to obtain a plurality of beam measurements on each of a plurality of downlink receive beams via the antenna array 920 for each of the identified downlink transmit beams. The communication and processing circuitry 941 may further be configured to generate a beam measurement report for transmission to the base station using the communication and processing circuitry 941.

The communication and processing circuitry 941 may further be configured to identify one or more selected uplink beam(s) based on the beam measurements obtained from the downlink beam reference signals. In some examples, the communication and processing circuitry 941 may be configured to compare the respective RSRP (or other beam measurement) measured on each of the downlink receive beams for each of the serving downlink transmit beams to identify the serving downlink receive beams and to further utilize the serving downlink receive beams as the selected uplink transmit beams. Each serving downlink receive beam may have the highest measured RSRP (or other beam measurement) for one of the downlink transmit beams.

The communication and processing circuitry 941 may be configured to generate one or more uplink transmit beams for transmission in an uplink beam sweep. Each uplink transmit beam may carry an uplink reference signal (e.g., an SRS) for measurement by the base station. The communication and processing circuitry 941 may further be configured to identify the selected uplink transmit beam(s) selected by the base station based on the uplink beam measurements. For example, the communication and processing circuitry 941 may be configured to receive an indication of the selected uplink transmit beam(s) from the base station.

In some implementations where the communication involves receiving information, the communication and processing circuitry 941 may obtain information from a component of the UE 900 (e.g., from the transceiver 910 that receives the information via radio frequency signaling or some other type of signaling suitable for the applicable communication medium), process (e.g., decode) the information, and output the processed information. For example, the communication and processing circuitry 941 may output the information to another component of the processor 904, to the memory 905, or to the bus interface 908. In some examples, the communication and processing circuitry 941 may receive one or more of signals, messages, other information, or any combination thereof. In some examples, the communication and processing circuitry 941 may receive information via one or more channels. In some examples, the communication and processing circuitry 941 may include functionality for a means for receiving. In some examples, the communication and processing circuitry 941 may include functionality for a means for decoding.

In some implementations where the communication involves sending (e.g., transmitting) information, the communication and processing circuitry 941 may obtain information (e.g., from another component of the processor 904, the memory 905, or the bus interface 908), process (e.g., encode) the information, and output the processed information. For example, the communication and processing circuitry 941 may output the information to the transceiver 910 (e.g., that transmits the information via radio frequency signaling or some other type of signaling suitable for the applicable communication medium). In some examples, the communication and processing circuitry 941 may send one or more of signals, messages, other information, or any combination thereof. In some examples, the communication and processing circuitry 941 may send information via one or more channels. In some examples, the communication and processing circuitry 941 may include functionality for a means for sending (e.g., a means for transmitting). In some examples, the communication and processing circuitry 941 may include functionality for a means for encoding.

The processor 904 may include link switch processing circuitry 942 configured to perform link switch processing-related operations as discussed herein (e.g., one or more of the operations described in conjunction with FIGS. 7-8). In some examples, the link switch processing circuitry 942 may include functionality for a means for receiving a message indicating a feeder link switch (e.g., as described in conjunction with the RRC message 706 and/or the TA command 710 of FIG. 7 and/or reference 816 of FIG. 8 and/or reference 828 of FIG. 8 and/or block 1002 of FIG. 10 and/or block 1104 of FIG. 11). The link switch processing circuitry 942 may further be configured to execute link switch processing software 952 included on the computer-readable medium 906 to implement one or more functions described herein.

In some examples, the link switch processing circuitry 942 may be configured to process RRC messages, TA commands, and other messages transmitted by a base station to determine whether a feeder link switch is indicated. In some examples, the link switch processing circuitry 942 may be configured to process a received RRC message to identify a switch wait period and/or PRACH configuration parameters for sending a PRACH preamble via a feeder link. In some examples, the link switch processing circuitry 942 may be configured to wait a period of time based on a feeder link switch wait period before commencing communication via a feeder link. In some examples, the link switch processing circuitry 942 may be configured to receive an RNTI for a set of UEs including the UE 900, receive a PDCCH, decode the PDCCH based on the RNTI to recover scheduling information for a PDSCH that carries a timing adjust command, and thereby receive the timing adjust command according to the scheduling information. In some examples, the link switch processing circuitry 942 may be configured to receive a timing adjust command that includes a timing advance value and/or a modified slot offset.

The processor 904 may include timing control circuitry 943 configured to perform timing control-related operations as discussed herein (e.g., one or more of the operations described in conjunction with FIGS. 7-8). In some examples, the timing control circuitry 943 may include functionality for a means for adjusting timing (e.g., as described in conjunction with the TA command 710 of FIG. 7 and/or reference 828 of FIG. 8 and/or block 1004 of FIG. 10 and/or block 1106 of FIG. 11). The timing control circuitry 943 may further be configured to execute timing control software 953 included on the computer-readable medium 906 to implement one or more functions described herein.

In some examples, the timing control circuitry 943 may be configured to adjust timing of the UE 900 used for communication with a base station. In some examples, the timing control circuitry 943 may be configured to adjust a TA parameter based on a timing advance adjustment or a timing advance absolute value received from a base station (e.g., via a TA command) In some examples, the timing control circuitry 943 may be configured to adjust a cumulative timing advance parameter based on a timing advance adjustment or set a cumulative timing advance parameter to a timing advance absolute value. In some examples, the timing control circuitry 943 may be configured to adjust slot timing for communication via a feeder link based on a modified slot offset. In some examples, the timing control circuitry 943 may be configured to add the modified slot offset to a first parameter (e.g., a time offset K1), a second parameter (e.g., a time offset K2), or a third parameter (e.g., a time offset for PUR) for HARQ timing. In some examples, the timing control circuitry 943 may be configured to select a standard slot offset or a modified slot offset for communication via a feeder link based on a received indication.

Figure 10:
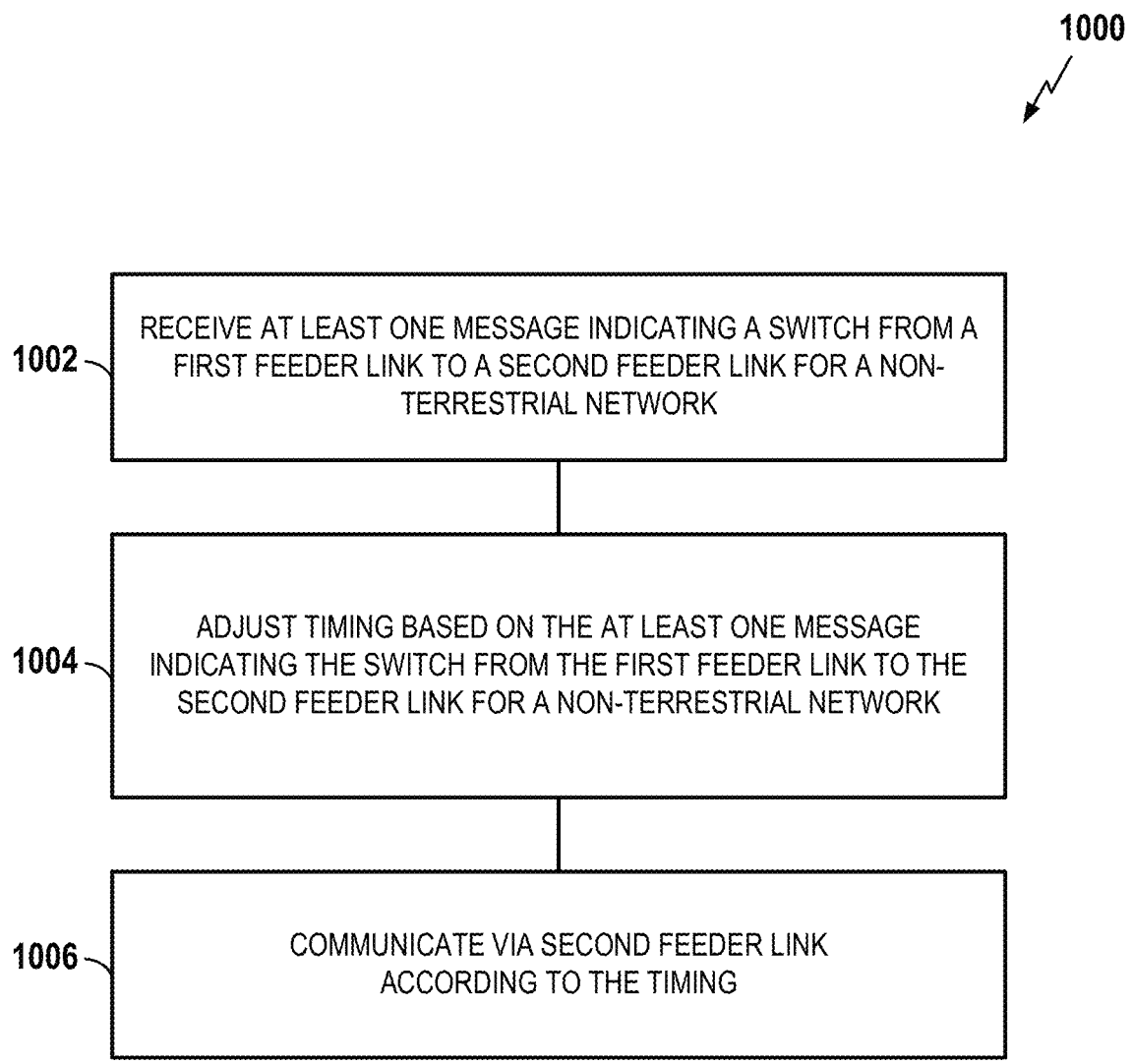
FIG. 10 is a flowchart illustrating an example of a process for adjusting timing according to some aspects.

FIG. 10 is a flow chart illustrating an example wireless communication method 1000 according to some aspects of the disclosure. As described herein, some or all illustrated features may be omitted in a particular implementation within the scope of the present disclosure, and some illustrated features may not be required for implementation of all examples. In some examples, the method 1000 may be carried out by the UE 900 illustrated in FIG. 9. In some examples, the method 1000 may be carried out by any suitable apparatus or means for carrying out the functions or algorithm described below.

At block 1002, a UE receives at least one message (e.g., an RRC message or a timing adjust command) indicating a switch from a first feeder link to a second feeder link for a non-terrestrial network. For example, the link switch processing circuitry 942 together with the communication and processing circuitry 941 and the transceiver 910, shown and described above in connection with FIG. 9, may receive an RRC message and/or a MAC CE via a PDSCH or some other channel.

At block 1004, the UE adjusts timing based on the at least one message indicating the switch from the first feeder link to the second feeder link for the non-terrestrial network. For example, the timing control circuitry 943, shown and described above in connection with FIG. 9, may advance or retard its timing in preparation for communication with another base station.

At block 1006, the UE communicates via the second feeder link according to the timing. For example, the communication and processing circuitry 941 and the transceiver 910 may generate messages and transmit the messages using the adjusted timing. Similarly, the communication and processing circuitry 941 and the transceiver 910 may receive messages using the adjusted timing and process the messages.

In some examples, the at least one message may include a timing adjust command. In some examples, adjusting the timing based on the at least one message may include adjusting the timing based on the timing adjust command.

In some examples, the timing adjust command may include (e.g., may be) a timing advance adjustment or a timing advance absolute value to be used by a plurality of user equipment including the user equipment for communication via the second feeder link. In some examples, adjusting the timing based on the at least one message may include adjusting a timing advance parameter for uplink communication based on the timing advance adjustment or the timing advance absolute value.

In some examples, the communication via the first feeder link may be based on a cumulative timing advance parameter. In some examples, the timing adjust command may include (e.g., may be) a timing advance adjustment or a timing advance absolute value. In some examples, adjusting the timing based on the at least one message may include adjusting the cumulative timing advance parameter based on the timing advance adjustment or setting the cumulative timing advance parameter to the timing advance absolute value.

In some examples, the method 1000 may further include receiving a radio network temporary identifier (RNTI) for a plurality of user equipment including the user equipment, receiving a physical downlink control channel (PDCCH), and decoding the PDCCH based on the RNTI to recover scheduling information for a physical downlink shared channel (PDSCH) that carries the timing adjust command. In some examples, receiving the timing adjust command may include receiving the timing adjust command based on the scheduling information.

In some examples, the timing adjust command may include a timing advance value, a modified slot offset, or a combination thereof (e.g., a timing advance value; or a modified slot offset; or a timing advance value and a modified slot offset) to be used by the plurality of user equipment including the user equipment for the communication via the second feeder link. In some examples, the modified slot offset may be based on the timing advance value. In some examples, the modified slot offset may be based on the timing advance value if the timing adjust command does not include the modified slot offset. In some examples, the method 1000 may further include adjusting slot timing for the communication via the second feeder link based on the modified slot offset.

In some examples, the modified slot offset may include (e.g., may be) a slot offset for at least one of hybrid automatic repeat request (HARQ) timing, physical uplink shared channel (PUSCH) timing, media access control (MAC) control element (CE) application delay, sounding reference signal (SRS) triggering, channel state information (CSI) reporting, uplink transmission on a preconfigured uplink resource (PUR), a random access response (RAR) window, or a combination thereof.

In some examples, the adjustment of the slot timing may include adding the adjusted slot offset to a K1 or K2 parameter for hybrid automatic repeat request (HARQ) timing. The K1 parameter specifies the time offset between the slot in which a UE receives data scheduled on a PDSCH and the slot in which the UE transmits HARQ feedback (e.g., ACK/NACK) for that data. The K2 parameter specifies the offset between the slot in which a UE receives a DCI that schedules a PUSCH data transmission and the slot in which the UE transmits that PUSCH data.

In some examples, the adjustment of the slot timing may include adding the modified slot offset to a first parameter (e.g., K1), a second parameter (e.g., K2), or a third parameter for hybrid automatic repeat request (HARQ) timing. In some examples, the first parameter may specify a first time offset between a first slot in which the user equipment is to receive downlink data and a second slot in which the user equipment is to transmit HARQ feedback for the downlink data. In some examples, the second parameter may specify a second time offset between a third slot in which the user equipment is to receive downlink control information that schedules an uplink data transmission and a fourth slot in which the user equipment is to transmit the uplink data transmission. In some examples (e.g., for PUR), the third parameter may specify a third time offset between a fifth slot in which the user equipment is to transmit uplink data and a sixth slot in which the user equipment is to receive an acknowledgement for the uplink data.

In some examples, the method 1000 may further include receiving an indication of whether a standard slot offset or a modified slot offset is to be used by the plurality of user equipment including the user equipment. In some examples, the method 1000 may further include selecting the standard slot offset or the modified slot offset for communication via the second feeder link based on the indication.

In some examples, the at least one message may include a radio resource control (RRC) connection reconfiguration message. In some examples, the method 1000 may further include switching from the first feeder link to the second feeder link based on the RRC connection reconfiguration message.

In some examples, the RRC connection reconfiguration message may indicate a feeder link switch wait period to be used by one or more of the plurality of user equipment including the user equipment. In some examples, the method 1000 may further include waiting a period of time based on the feeder link switch wait period before commencing communication via the second feeder link.

In some examples, the RRC connection reconfiguration message may indicate that the user equipment is to send a physical random access channel (PRACH) preamble via the second feeder link. In some examples, the method 1000 may further include sending the PRACH preamble via the second feeder link.

In some examples, the RRC connection reconfiguration message may include physical random access channel (PRACH) configuration parameters for the user equipment. In some examples, sending the PRACH preamble may include sending the PRACH preamble via the second feeder link according to the PRACH configuration parameters.

In some examples, the method 1000 may further include receiving a radio resource control (RRC) connection reconfiguration message that indicates a feeder link switch wait period to be used by one or more of the plurality of user equipment including the user equipment. In some examples, the method 1000 may further include determining that the RRC connection reconfiguration message does not indicate that the user equipment is to send a physical random access channel (PRACH) preamble via the second feeder link. In some examples, the method 1000 may further include, as a result of the determining that the RRC connection reconfiguration message does not indicate that the user equipment is to send a PRACH preamble via the second feeder link, waiting a period of time based on the feeder link switch wait period before commencing the communication via the second feeder link.

In some examples, the at least one message may include a radio resource control (RRC) connection reconfiguration message and a timing adjust command.

Figure 11:
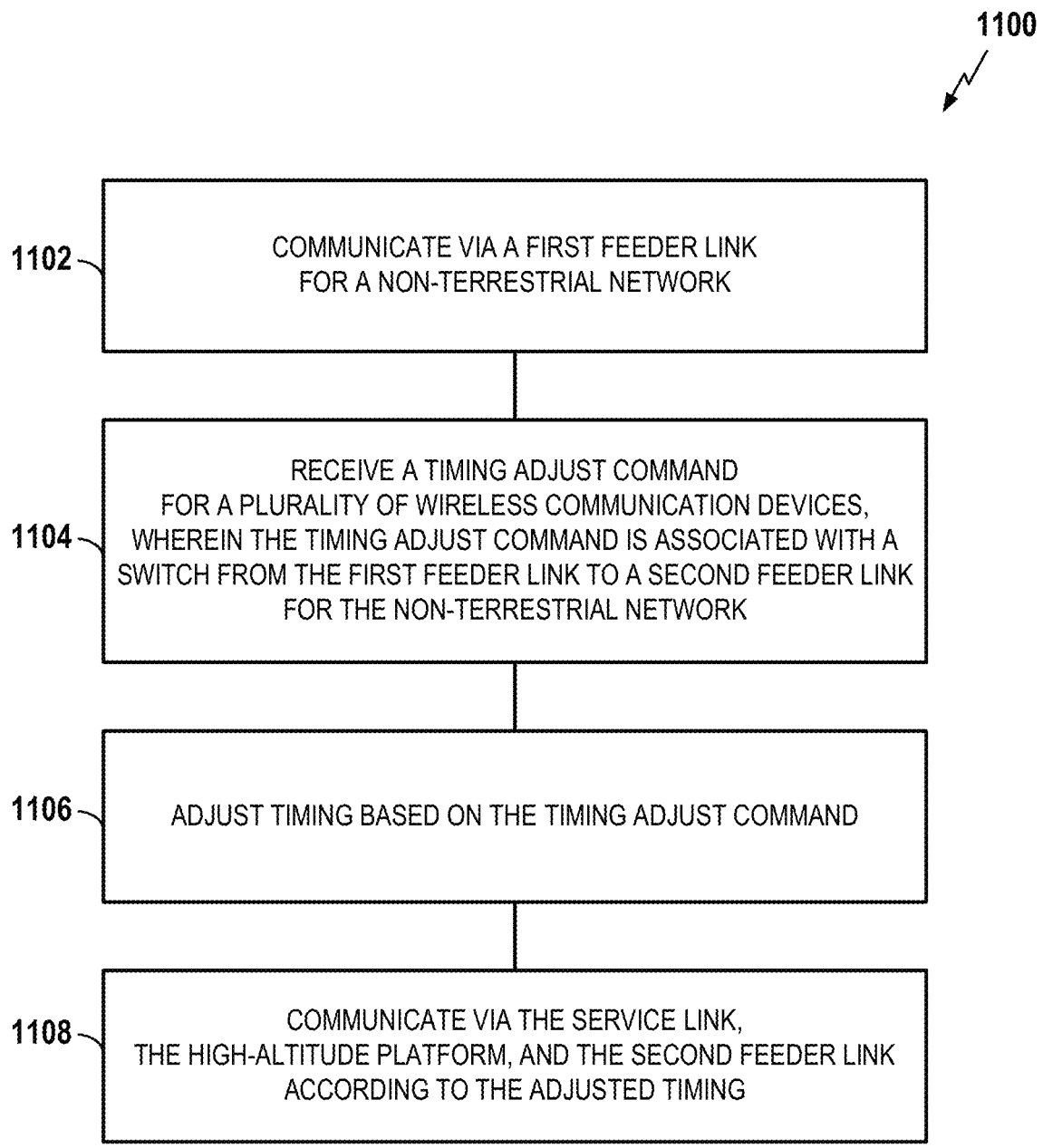
FIG. 11 is a flowchart illustrating an example of a process for adjusting timing according to some aspects.

FIG. 11 is a flow chart illustrating an example wireless communication method 1100 according to some aspects of the disclosure. As described herein, some or all illustrated features may be omitted in a particular implementation within the scope of the present disclosure, and some illustrated features may not be required for implementation of all examples. In some examples, the method 1100 may be carried out by the UE 900 illustrated in FIG. 9. In some examples, the method 1100 may be carried out by any suitable apparatus or means for carrying out the functions or algorithm described below.

At block 1102, an apparatus (e.g., a wireless communication device) communicates via a service link, a high-altitude platform, and a first feeder link for a non-terrestrial network. For example, the communication and processing circuitry 941 and the transceiver 910, shown and described above in connection with FIG. 9, may generate messages and transmit the messages using a first timing specified for a first base station. Similarly, the communication and processing circuitry 941 and the transceiver 910 may receive messages using the first timing and process the messages.

At block 1104, the apparatus receives a timing adjust command (e.g., a timing adjust command) for a plurality of wireless communication devices, wherein the timing adjust command may be associated with a switch from the first feeder link to a second feeder link for the non-terrestrial network. For example, the link switch processing circuitry 942 together with the communication and processing circuitry 941 and the transceiver 910, shown and described above in connection with FIG. 9, may receive a MAC CE via a PDSCH or some other channel.

At block 1106, the apparatus adjusts timing based on the timing adjust command. For example, the timing control circuitry 943, shown and described above in connection with FIG. 9, may advance or retard its timing in preparation for communication with another base station.

At block 1108, the apparatus communicates via the service link, the high-altitude platform, and the second feeder link according to the timing adjust command. For example, the communication and processing circuitry 941 and the transceiver 910 may generate messages and transmit the messages to a second base station using the adjusted timing. Similarly, the communication and processing circuitry 941 and the transceiver 910 may receive messages from the second base station using the adjusted timing and process the messages.

In some examples, the timing adjust command may include (e.g., may be) a timing advance adjustment or a timing advance absolute value to be used by the plurality of wireless communication devices for communication via the second feeder link. In some examples, the communication via the second feeder link according to the timing adjust command may include adjusting a timing advance parameter for uplink communication based on the timing advance adjustment or the timing advance absolute value.

In some examples, the communication via the first feeder link may be based on a cumulative timing advance parameter. In some examples, the timing adjust command may include (e.g., may be) a timing advance adjustment or a timing advance absolute value. In some examples, the method 1100 may further include, prior to the communication via the second feeder link, adjusting the cumulative timing advance parameter based on the timing advance adjustment or setting the cumulative timing advance parameter to the timing advance absolute value.

In some examples, the method 1100 may further include: receiving a radio resource control (RRC) connection reconfiguration message that indicates the switch from the first feeder link to the second feeder link; and switching from the first feeder link to the second feeder link based on the RRC connection reconfiguration message.

In some examples, the RRC connection reconfiguration message may indicate a feeder link switch wait period to be used by one or more of the plurality of wireless communication devices. In some examples, the wireless communication device may wait a period of time based on the feeder link switch wait period before commencing the communication with the base station via the second feeder link.

In some examples, the RRC connection reconfiguration message may indicate that the wireless communication device is to send a physical random access channel (PRACH) preamble via the second feeder link. In some examples, the method 1100 may further include sending the PRACH preamble via the second feeder link.

In some examples, the RRC connection reconfiguration message may include physical random access channel (PRACH) configuration parameters for the wireless communication device. In some examples, the PRACH preamble may be sent via the second feeder link according to the PRACH configuration parameters.

In some examples, the method 1100 may further include: receiving a radio resource control (RRC) connection reconfiguration message that indicates a feeder link switch wait period to be used by one or more of the plurality of wireless communication devices; determining that the RRC connection reconfiguration message does not indicate that the wireless communication device is to send a physical random access channel (PRACH) preamble via the second feeder link; and as a result of the determination, waiting a period of time based on the feeder link switch wait period before commencing the communication via the second feeder link.

In some examples, the method 1100 may further include: receiving a radio network temporary identifier (RNTI) for the plurality of wireless communication devices; receiving a physical downlink control channel (PDCCH); and decoding the PDCCH based on the RNTI to recover scheduling information for a physical downlink shared channel (PDSCH) that carries the timing adjust command. In some examples, the receipt of the timing adjust command may be based on the scheduling information.

In some examples, the timing adjust command may include a timing advance value and a modified slot offset to be used by the plurality of wireless communication devices for the communication via the second feeder link. In some examples, the modified slot offset may be based on the timing advance value. In some examples, the method 1100 may further include adjusting slot timing for the communication via the second feeder link based on the modified slot offset.

In some examples, the modified slot offset may include (e.g., may be) a slot offset for at least one of: hybrid automatic repeat request (HARQ) timing, physical uplink shared channel (PUSCH) timing, media access control (MAC) control element (CE) application delay, sounding reference signal (SRS) triggering, channel state information (CSI) reporting, or a random access response (RAR) window.

In some examples, the adjustment of the slot timing may include adding the adjusted slot offset to a K1 or K2 parameter for hybrid automatic repeat request (HARQ) timing.

In some examples, the method 1100 may further include: receiving an indication of whether a standard slot offset or a modified slot offset is to be used by the plurality of wireless communication devices; and selecting the standard slot offset or the modified slot offset for communication via the second feeder link based on the indication.

Figure 12:
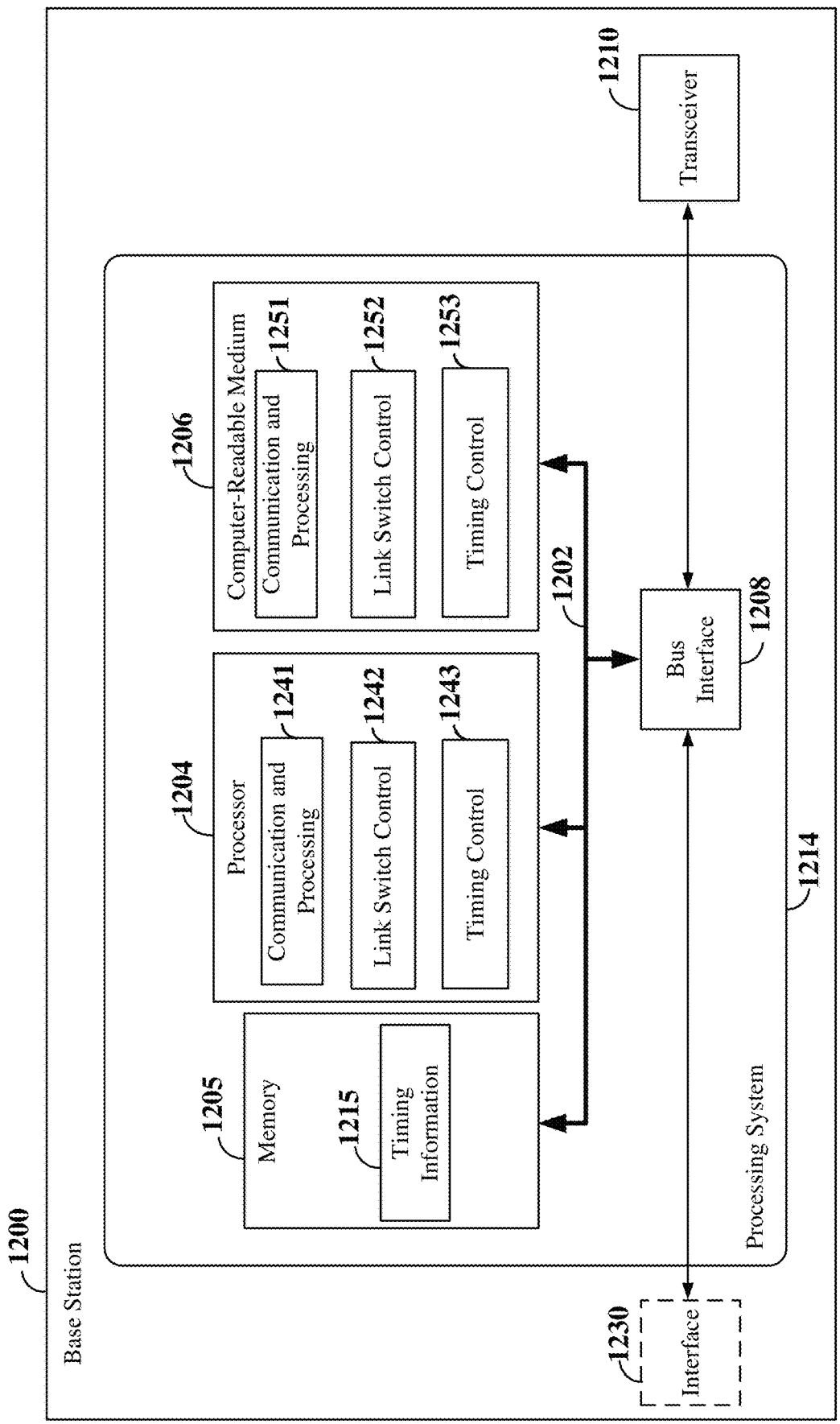
FIG. 12 is a block diagram illustrating an example of a hardware implementation for a base station employing a processing system according to some aspects.

FIG. 12 is a conceptual diagram illustrating an example of a hardware implementation for base station (BS) 1200 employing a processing system 1214. In some implementations, the BS 1200 may correspond to any of the BSs (e.g., gNBs) or scheduling entities shown in any of FIGS. 1, 2, 4, 5, 6, 7, and 8.

In accordance with various aspects of the disclosure, an element, or any portion of an element, or any combination of elements may be implemented with the processing system 1214. The processing system may include one or more processors 1204. The processing system 1214 may be substantially the same as the processing system 914 illustrated in FIG. 9, including a bus interface 1208, a bus 1202, memory 1205, a processor 1204, and a computer-readable medium 1206. The memory 1205 may store timing information 1215 (e.g., timing adjust information) for a UE. Furthermore, the BS 1200 may include an interface 1230 (e.g., a network interface) that provides a means for communicating with at least one other apparatus within a core network and with at least one radio access network.

The BS 1200 may be configured to perform any one or more of the operations described herein (e.g., as described above in conjunction with FIGS. 1-8 and as described below in conjunction with FIGS. 13-15). In some aspects of the disclosure, the processor 1204, as utilized in the BS 1200, may include circuitry configured for various functions.

The processor 1204 may be configured to generate, schedule, and modify a resource assignment or grant of time-frequency resources (e.g., a set of one or more resource elements). For example, the processor 1204 may schedule time-frequency resources within a plurality of time division duplex (TDD) and/or frequency division duplex (FDD) subframes, slots, and/or mini-slots to carry user data traffic and/or control information to and/or from multiple UEs.

The processor 1204 may be configured to schedule resources for the transmission of downlink reference signals (e.g., SSBs or CSI-RSs) on a plurality of downlink beams for a downlink beam sweep in accordance with a selected downlink beam sweep type and selected number of downlink reference signal resources indicated in a request for uplink beam refinement received from a UE. The processor 1204 may further be configured to schedule resources for the uplink transmission of uplink reference signals (e.g., SRSs) on a plurality of uplink beams for an uplink beam sweep in accordance with a selected beam sweep type and selected number of uplink reference signal resources indicated in the request. The processor 1204 may further be configured to schedule resources that may be utilized by the UE to transmit the request. For example, the uplink beam refinement request resources may include resources scheduled for transmission of a PUCCH, PUSCH, PRACH occasion or RRC message. In some examples, the processor 1204 may be configured to schedule PUSCH resources for the uplink beam refinement request in response to receiving a scheduling request from the UE.

The processor 1204 may further be configured to schedule resources for the transmission of an uplink signal. In some examples, the resources may be associated with one or more uplink transmit beams and one or more corresponding receive beams applied to the uplink signal (e.g., based on the uplink BPLs) based on an indication of the uplink signal associated with the one or more uplink transmit beams included in the request. In some examples, the resources may be associated with an uplink transmission scheme indicating a number of uplink transmit beams to be utilized for the uplink signal, a number of repetitions per uplink transmit beam of the uplink signal, and a multiplexing scheme when more than one uplink transmit beam is used to transmit the uplink signal.

In some aspects of the disclosure, the processor 1204 may include communication and processing circuitry 1241. The communication and processing circuitry 1244 may be configured to communicate with a UE. The communication and processing circuitry 1241 may include one or more hardware components that provide the physical structure that performs various processes related to communication (e.g., signal reception and/or signal transmission) as described herein. The communication and processing circuitry 1241 may further include one or more hardware components that provide the physical structure that performs various processes related to signal processing (e.g., processing a received signal and/or processing a signal for transmission) as described herein. The communication and processing circuitry 1241 may further be configured to execute communication and processing software 1251 included on the computer-readable medium 1206 to implement one or more functions described herein.

In some examples, the communication and processing circuitry 1241 may be configured to receive and process uplink beamformed signals at a mmWave frequency or a sub-6 GHz frequency via the transceiver 1210 and an antenna array. For example, the communication and processing circuitry 1241 may be configured to receive a respective reference signal (e.g., SRS or DMRS) on each of a plurality of uplink beams from the UE during an uplink beam sweep.

In some examples, the communication and processing circuitry 1241 may further be configured to generate and transmit downlink beamformed signals at a mmWave frequency or a sub-6 GHz frequency via the transceiver 1210 and the antenna array 1220. For example, the communication and processing circuitry 1241 may be configured to transmit a respective downlink reference signal (e.g., SSB or CSI-RS) on each of a plurality of downlink beams to the UE during a downlink beam sweep via at least one first antenna panel of the antenna array 1220. The communication and processing circuitry 1241 may further be configured to receive a beam measurement report from the UE.

The communication and processing circuitry 1241 may further be configured to receive a request from the UE. For example, the request may be included in a MAC-CE carried in a PUSCH, UCI in a PUCCH or PUSCH, a random access message, or an RRC message. The communication and processing circuitry 1241 may further be configured to receive a scheduling request (e.g., via UCI in a PUCCH) from the UE for an uplink grant for the PUSCH.

The communication and processing circuitry 1241 may further be configured to receive an uplink signal on one or more uplink receive beams via one or more uplink transmit beams applied to the uplink signal. For example, the communication and processing circuitry 1241 may be configured to receive the uplink signal on one or more uplink receive beams. The uplink signal may include, for example, a PUCCH, PUSCH, SRS, DMRS, or PRACH.

The communication and processing circuitry 1241 may further be configured to control the antenna array 1220 and transceiver 1210 to generate a plurality of downlink transmit beams during a downlink beam sweep. The communication and processing circuitry 1241 may further be configured to receive a beam measurement report from the UE using the communication and processing circuitry 1244. The communication and processing circuitry 1241 may further be configured to identify one or more selected uplink beam(s) based on the beam measurements. In some examples, the communication and processing circuitry 1241 may be configured to compare the respective RSRP (or other beam measurement) measured on each of the downlink receive beams for each of the serving downlink transmit beams to identify the serving downlink receive beams and to further identify the serving downlink receive beams as the selected uplink transmit beams. Each serving downlink receive beam may have the highest measured RSRP (or other beam measurement) for one of the downlink transmit beams.

The communication and processing circuitry 1241 may be configured to receive one or more uplink transmit beams in an uplink beam sweep. Each uplink transmit beam may carry an uplink reference signal (e.g., an SRS) for measurement by the communication and processing circuitry 1241. The communication and processing circuitry 1241 may further be configured to obtain a plurality of beam measurements on each of a plurality of uplink receive beams for each of the uplink transmit beams. The communication and processing circuitry 1241 may further be configured to select the selected uplink transmit beam(s) and corresponding uplink receive beams forming respective uplink BPLs based on the uplink beam measurements.

In some implementations wherein the communication involves receiving information, the communication and processing circuitry 1241 may obtain information from a component of the BS 1200 (e.g., from the transceiver 1210 that receives the information via radio frequency signaling or some other type of signaling suitable for the applicable communication medium), process (e.g., decode) the information, and output the processed information. For example, the communication and processing circuitry 1241 may output the information to another component of the processor 1204, to the memory 1205, or to the bus interface 1208. In some examples, the communication and processing circuitry 1241 may receive one or more of signals, messages, other information, or any combination thereof. In some examples, the communication and processing circuitry 1241 may receive information via one or more channels. In some examples, the communication and processing circuitry 1241 may include functionality for a means for receiving. In some examples, the communication and processing circuitry 1241 may include functionality for a means for decoding.

In some implementations wherein the communication involves sending (e.g., transmitting) information, the communication and processing circuitry 1241 may obtain information (e.g., from another component of the processor 1204, the memory 1205, or the bus interface 1208), process (e.g., encode) the information, and output the processed information. For example, the communication and processing circuitry 1241 may output the information to the transceiver 1210 (e.g., that transmits the information via radio frequency signaling or some other type of signaling suitable for the applicable communication medium). In some examples, the communication and processing circuitry 1241 may send one or more of signals, messages, other information, or any combination thereof. In some examples, the communication and processing circuitry 1241 may send information via one or more channels. In some examples, the communication and processing circuitry 1241 may include functionality for a means for sending (e.g., a means for transmitting). In some examples, the communication and processing circuitry 1241 may include functionality for a means for encoding.

The processor 1204 may include link switch control circuitry 1242 configured to perform link switch control-related operations as discussed herein (e.g., one or more of the operations described in conjunction with FIGS. 7-8). In some examples, the link switch control circuitry 1242 may include functionality for a means for generating a message indicating a feeder link switch (e.g., as described in conjunction with the RRC message 706 and/or the TA command 710 of FIG. 7 and/or reference 816 of FIG. 8 and/or reference 828 of FIG. 8 and/or block 1304 of FIG. 13 and/or block 1406 of FIG. 14 and/or block 1504 of FIG. 15). In some examples, the link switch control circuitry 1242 may include functionality for a means for transmitting a message indicating a feeder link switch (e.g., as described in conjunction with the RRC message 706 and/or the TA command 710 of FIG. 7 and/or reference 816 of FIG. 8 and/or reference 828 of FIG. 8 and/or block 1306 of FIG. 13 and/or block 1408 of FIG. 14 and/or block 1506 of FIG. 15). The link switch control circuitry 1242 may further be configured to execute link switch control software 1252 included on the computer-readable medium 1206 to implement one or more functions described herein.

In some examples, the link switch control circuitry 1242 may be configured to set up and tear down links (e.g., service links to a satellite) and/or monitor the links to determine whether communication will switch to another link. In some examples, the link switch control circuitry 1242 may be configured to determine whether a satellite is moving out of the coverage area of the BS 1200 and thereby determine whether a feeder link switch will occur. In some examples, the link switch control circuitry 1242 may be configured to determine a feeder link switch wait period to be used by one or more of a set of UEs. In some examples, the link switch control circuitry 1242 may be configured to send an RRC connection reconfiguration message (e.g., including an indication of the feeder link switch wait period) to a set of UEs prior to a switch from a first feeder link to a second feeder link. In some examples, the RRC connection reconfiguration message includes PRACH configuration parameters to be used by one or more of the set of UEs for sending PRACH messages in conjunction with the feeder link switch.

The processor 1204 may include timing control circuitry 1243 configured to perform timing control-related operations as discussed herein (e.g., one or more of the operations described in conjunction with FIGS. 7-8). In some examples, the timing control circuitry 1243 may include functionality for a means for determining timing (e.g., as described in conjunction with the TA command 710 of FIG. 7 and/or reference 826 of FIG. 8 and/or block 1304 of FIG. 13 and/or block 1406 of FIG. 14 and/or block 1504 of FIG. 15. The timing control circuitry 1243 may further be configured to execute timing control software 1253 included on the computer-readable medium 1206 to implement one or more functions described herein.

In some examples, the timing control circuitry 1243 may be configured to generate timing adjust (e.g., advance) information to be sent to one or more UEs. In some examples, the timing control circuitry 1243 may be configured to analyze the timing of PRACH preambles 708 received by the BS 1200 to determine a TA value and/or other timing information to be sent via a TA command. In some examples, the timing control circuitry 1243 may be configured to determine a timing of a second feeder link or a difference in timing between a first feeder link and the second feeder link. In some examples, the timing control circuitry 1243 may be configured to determine, based on the difference in timing or the timing of the second feeder link, a timing advance adjustment or a timing advance absolute value to be sent to one or more UEs via a timing adjust command. In some examples, the timing control circuitry 1243 may be configured to generate scheduling information for a PDSCH that is used for sending a timing adjust command, determining an RNTI for a set of UEs, and using the RNTI to scramble a PDCCH that carries the scheduling information. In some examples, the timing control circuitry 1243 may be configured to modify a slot offset to be used by a set of UEs for communication via a feeder link based on a timing advance value. In some examples, the timing control circuitry 1243 may be configured to determine whether a standard slot offset or a modified slot offset is to be used by the set of UEs for communication via a feeder link and transmit an indication of this determination to the set of UEs.

Figure 13:
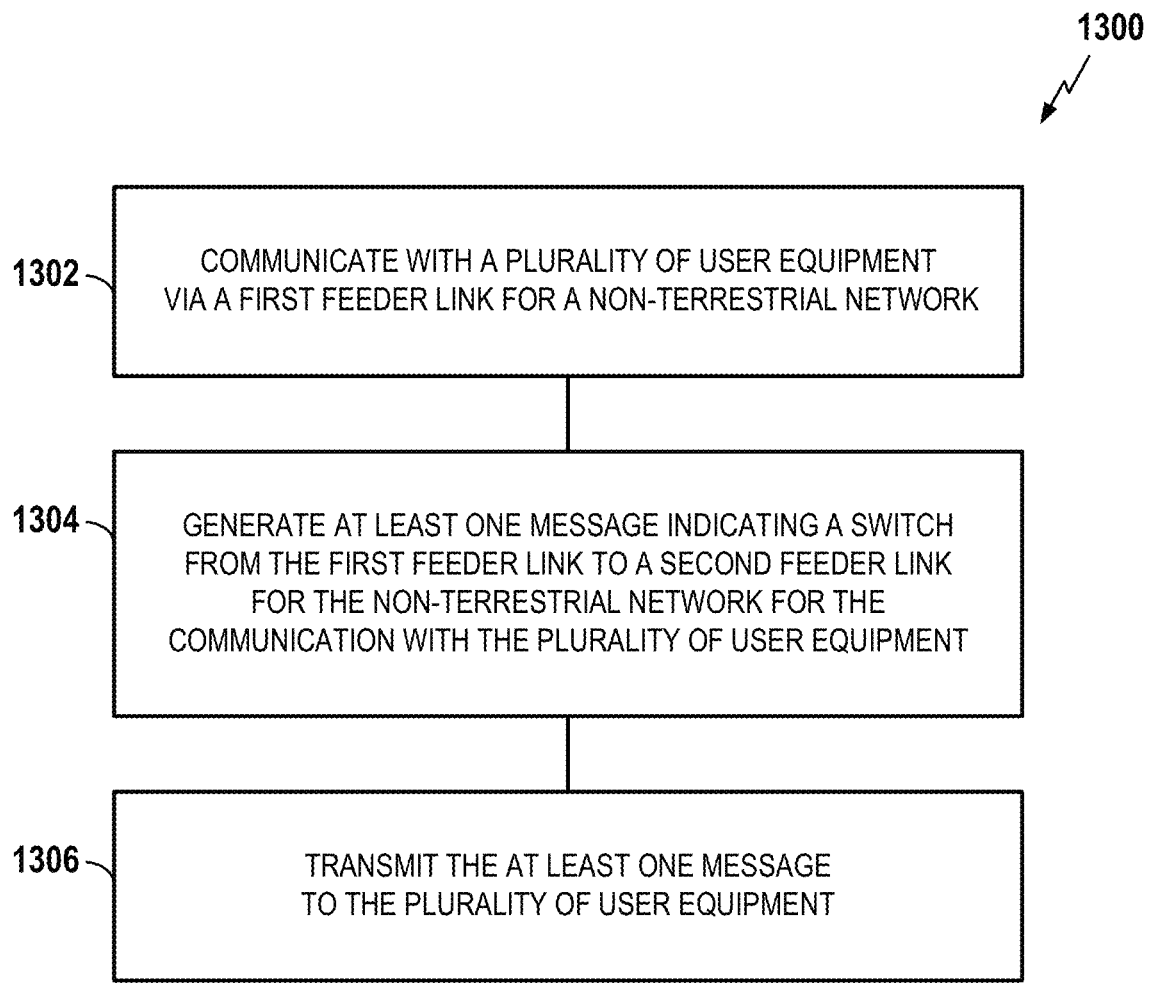
FIG. 13 is a flowchart illustrating an example of a process for switching feeder links according to some aspects.

FIG. 13 is a flow chart illustrating an example wireless communication method 1300 according to some aspects of the disclosure. As described herein, some or all illustrated features may be omitted in a particular implementation within the scope of the present disclosure, and some illustrated features may not be required for implementation of all examples. In some examples, the method 1300 may be carried out by the BS 1200 illustrated in FIG. 12. In some examples, the method 1300 may be carried out by any suitable apparatus or means for carrying out the functions or algorithm described below.

At block 1302, a base station communicates with a plurality of user equipment (a plurality of UEs) via a first feeder link for a non-terrestrial network. For example, the communication and processing circuitry 1241 and the transceiver 1210, shown and described above in connection with FIG. 12, may generate messages and transmit the messages to a UE via a satellite communication link. Similarly, the communication and processing circuitry 1241 and the transceiver 1210 may receive messages from a UE via a satellite communication link and process the messages.

At block 1304, the base station generates at least one message indicating a switch from the first feeder link to a second feeder link for the non-terrestrial network for the communication with the plurality of user equipment. For example, the link switch control circuitry 1242, shown and described above in connection with FIG. 12, may measure the signal strength or some other parameter of signals received from a satellite and determine based on the measurements that the satellite will soon switch its communication from the base station to another base station. The link switch control circuitry 1242 may then generate a message indicating that there will be a feeder link switch.

At block 1306, the base station transmits the at least one message to the plurality of user equipment. For example, the link switch control circuitry 1242 together with the communication and processing circuitry 1241 and the transceiver 1210, may transmit an RRC message and/or a MAC CE via a PDSCH or some other channel.

In some examples, the at least one message may include a timing adjust command. In some examples, generating the at least one message may include determining a timing of the second feeder link or a difference in timing between the first feeder link and the second feeder link and determining, based on the difference in timing or the timing of the second feeder link, a timing advance adjustment or a timing advance absolute value to be sent to the plurality of user equipment via the timing adjust command. In some examples, generating the at least one message may include receiving at least one physical random access channel (PRACH) preamble from at least one of the plurality of user equipment and determining, based on timing of the at least one PRACH preamble, a timing advance adjustment or a timing advance absolute value to be sent to the plurality of user equipment via the timing adjust command.

In some examples, the method 1300 may further include generating scheduling information for a physical downlink shared channel (PDSCH) that is used for sending the timing adjust command, determining a radio network temporary identifier (RNTI) for the plurality of user equipment, and scrambling a physical downlink control channel (PDCCH) comprising the scheduling information, wherein the scrambling uses the RNTI.

In some examples, generating the at least one message may include determining a timing advance value to be used by the plurality of user equipment for communication via the second feeder link and modifying a slot offset to be used by the plurality of user equipment for the communication via the second feeder link, wherein modifying the slot offset comprises modifying the slot offset based on the timing advance value. In some examples, the slot offset is for at least one of hybrid automatic repeat request (HARQ) timing, physical uplink shared channel (PUSCH) timing, media access control (MAC) control element (CE) application delay, sounding reference signal (SRS) triggering, channel state information (CSI) reporting, a random access response (RAR) window, or a combination thereof.

In some examples, the method 1300 may further include determining whether a standard slot offset or a modified slot offset is to be used by the plurality of user equipment for communication via the second feeder link. In some examples, the method 1300 may further include sending, to the plurality of user equipment, an indication of the determining of whether the standard slot offset of the modified slot offset is to be used.

In some examples, the at least one message may include a radio resource control (RRC) connection reconfiguration message. In some examples, sending the at least one message may include sending the RRC connection reconfiguration message to the plurality of user equipment prior to the switch from the first feeder link to the second feeder link.

In some examples, the method 1300 may further include determining a feeder link switch wait period to be used by one or more of the plurality of user equipment. In some examples, the RRC connection reconfiguration message may indicate the feeder link switch wait period.

In some examples, the RRC connection reconfiguration message may identify at least one of the plurality of user equipment that is to send a physical random access channel (PRACH) preamble to the base station via the second feeder link.

In some examples, the method 1300 may further include determining physical random access channel (PRACH) configuration parameters for at least one of the plurality of user equipment that is to send a PRACH preamble to the base station via the second feeder link. In some examples, the RRC connection reconfiguration message may include the PRACH configuration parameters.

In some examples, the at least one message may include a radio resource control (RRC) connection reconfiguration message and a timing adjust command.

Figure 14:
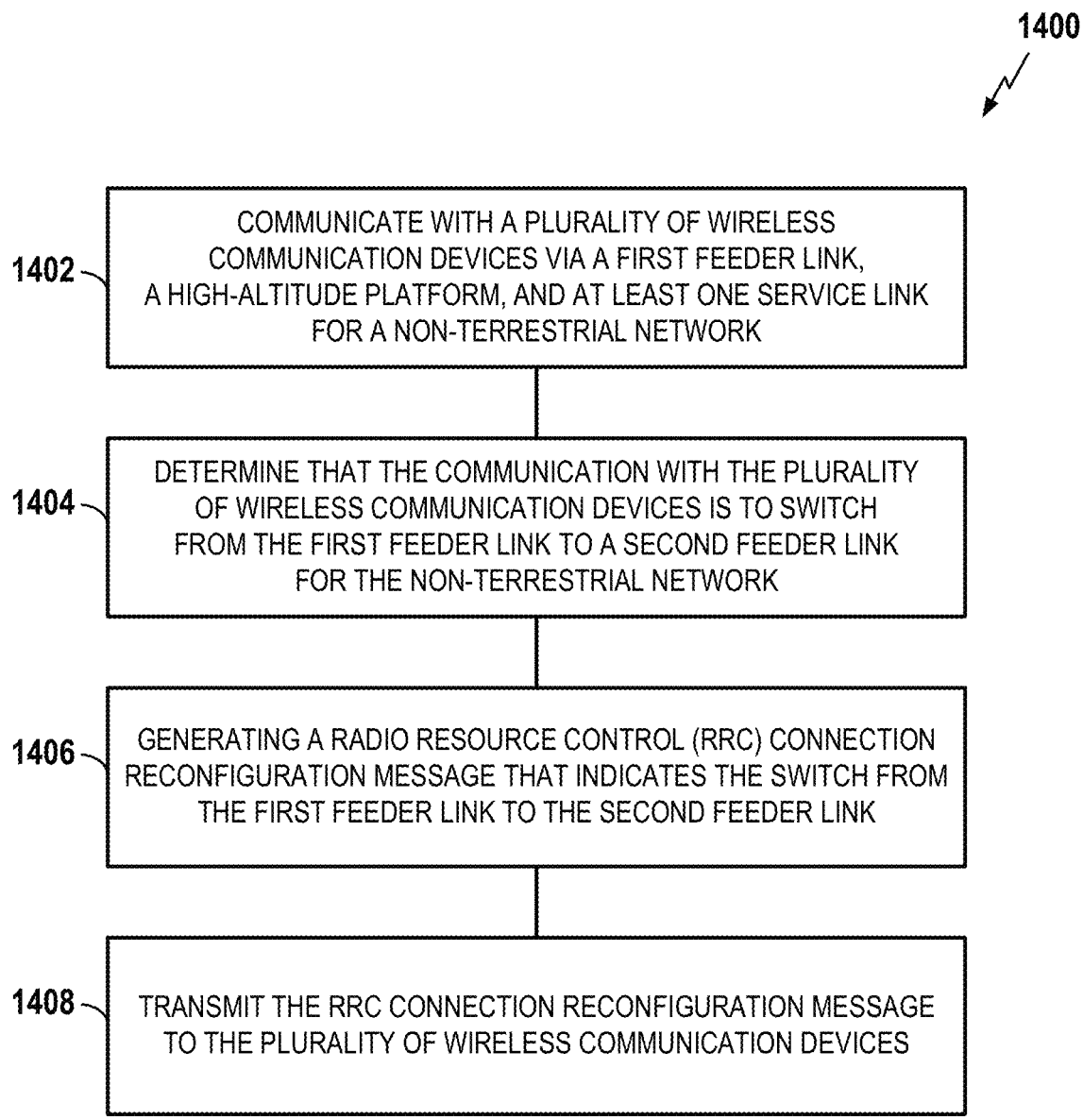
FIG. 14 is a flowchart illustrating an example of a process for switching feeder links according to some aspects.

FIG. 14 is a flow chart illustrating an example wireless communication method 1400 according to some aspects of the disclosure. As described herein, some or all illustrated features may be omitted in a particular implementation within the scope of the present disclosure, and some illustrated features may not be required for implementation of all examples. In some examples, the method 1400 may be carried out by the BS 1200 illustrated in FIG. 12. In some examples, the method 1400 may be carried out by any suitable apparatus or means for carrying out the functions or algorithm described below.

At block 1402, an apparatus (e.g., a gNB) communicates with a plurality of wireless communication devices via a first feeder link, a high-altitude platform, and at least one service link for a non-terrestrial network. For example, the communication and processing circuitry 1241 and the transceiver 1210, shown and described above in connection with FIG. 12, may generate messages and transmit the messages to a UE via a satellite communication link. Similarly, the communication and processing circuitry 1241 and the transceiver 1210 may receive messages from a UE via a satellite communication link and process the messages.

At block 1404, the apparatus determines that the communication with the plurality of wireless communication devices is to switch from the first feeder link to a second feeder link for the non-terrestrial network. For example, the link switch control circuitry 1242, shown and described above in connection with FIG. 12, may measure the signal strength or some other parameter of signals received from a satellite and determine based on the measurements that the satellite will soon switch its communication from the base station to another base station.

At block 1406, the apparatus generates a radio resource control (RRC) connection reconfiguration message that indicates the switch from the first feeder link to the second feeder link. For example, the link switch control circuitry 1242 may generate a message that includes a parameter indicating that there will be a feeder link switch.

At block 1408, the apparatus transmits the RRC connection reconfiguration message to the plurality of wireless communication devices. For example, the link switch control circuitry 1242 together with the communication and processing circuitry 1241 and the transceiver 1210, may transmit an RRC message via a PDSCH or some other channel.

In some examples, the method 1400 may further include determining a feeder link switch wait period to be used by one or more of the plurality of wireless communication devices. In some examples, the RRC connection reconfiguration message may indicate the feeder link switch wait period In some examples, the RRC connection reconfiguration message may identify at least one of the plurality of wireless communication devices that is to send a physical random access channel (PRACH) preamble to the base station via the second feeder link.

In some examples, the method 1400 may further include determining physical random access channel (PRACH) configuration parameters for at least one of the plurality of wireless communication devices that is to send a PRACH preamble to the base station via the second feeder link. In some examples, the RRC connection reconfiguration message may include the PRACH configuration parameters.

In some examples, the method 1400 may further include: determining a radio network temporary identifier (RNTI) for the plurality of wireless communication devices; and sending the RNTI to the plurality of wireless communication devices.

Figure 15:
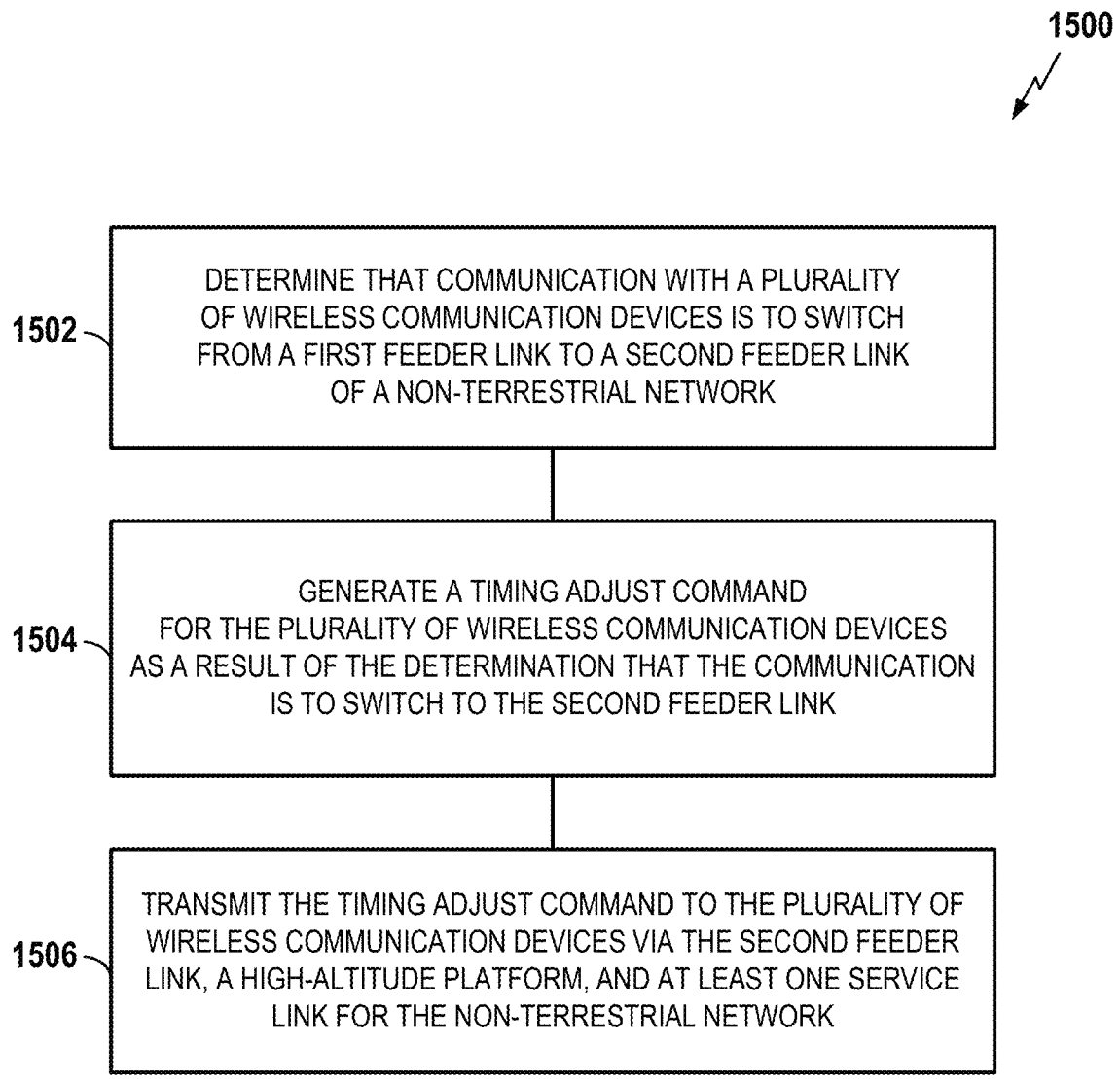
FIG. 15 is a flowchart illustrating an example of a process for providing a timing adjust command according to some aspects.

FIG. 15 is a flow chart illustrating an example wireless communication method 1500 according to some aspects of the disclosure. As described herein, some or all illustrated features may be omitted in a particular implementation within the scope of the present disclosure, and some illustrated features may not be required for implementation of all examples. In some examples, the method 1500 may be carried out by the BS 1200 illustrated in FIG. 12. In some examples, the method 1500 may be carried out by any suitable apparatus or means for carrying out the functions or algorithm described below.

At block 1502, an apparatus (e.g., a gNB) determines that communication with the plurality of wireless communication devices is to switch from the first feeder link to a second feeder link for a non-terrestrial network. For example, the link switch control circuitry 1242 together with the communication and processing circuitry 1241 and the transceiver 1210, shown and described above in connection with FIG. 12, may measure the signal strength or some other parameter of signals received from a satellite and determine based on the measurements that the satellite will soon switch its communication from the base station to another base station.

At block 1504, the apparatus generates a timing adjust command (e.g., a timing adjust command) for the plurality of wireless communication devices as a result of the determination that the apparatus is to switch to the second feeder link. For example, the timing control circuitry 1243, shown and described above in connection with FIG. 12, may compare the timing of RACH signals received from a UE to determine a timing adjust value.

At block 1506, the apparatus transmits the timing adjust command to the plurality of wireless communication devices via the second feeder link, a high-altitude platform, and at least one service link for the non-terrestrial network. For example, the timing control circuitry 1243 together with the communication and processing circuitry 1241 and the transceiver 1210, may transmit an RRC message via a PDSCH or some other channel.

In some examples, the generation of the timing adjust command may include: determining a timing of the second feeder link or a difference in timing between the first feeder link and the second feeder link; and determining, based on the difference in timing or the timing of the second feeder link, a timing advance adjustment or a timing advance absolute value to be sent to the plurality of wireless communication via the timing adjust command.

In some examples, the generation of the timing adjust command may include: receiving at least one physical random access channel (PRACH) preamble from at least one of the plurality of wireless communication devices; determining, based on timing of the at least one PRACH preamble, a timing advance adjustment or a timing advance absolute value to be sent to the plurality of wireless communication devices via the timing adjust command.

In some examples, the method 1500 may further include: generating scheduling information for a physical downlink shared channel (PDSCH) that may be used for sending the timing adjust command; determining a radio network temporary identifier (RNTI) for the plurality of wireless communication devices; and scrambling a physical downlink control channel (PDCCH) that includes the scheduling information. In some examples, the scrambling may be based on the RNTI.

In some examples, the generation of the timing adjust command may include: determining a timing advance value to be used by the plurality of wireless communication devices for communication via the second feeder link; modifying a slot offset to be used by the plurality of wireless communication devices for the communication via the second feeder link. In some examples, the modification of the slot offset may be based on the timing advance value.

In some examples, the modified slot offset may include (e.g., may be) a slot offset for at least one of: hybrid automatic repeat request (HARQ) timing, physical uplink shared channel (PUSCH) timing, media access control (MAC) control element (CE) application delay, sounding reference signal (SRS) triggering, channel state information (CSI) reporting, or a random access response (RAR) window.

In some examples, the method 1500 may further include: determining whether a standard slot offset or a modified slot offset is to be used by the plurality of wireless communication devices for communication via the second feeder link; and sending, to the plurality of wireless communication devices, an indication of the determination of whether the standard slot offset of the modified slot offset is to be used.

Aspect 1: A method for wireless communication at a user equipment, the method comprising: receiving at least one message indicating a switch from a first feeder link to a second feeder link for a non-terrestrial network; adjusting timing based on the at least one message indicating the switch from the first feeder link to the second feeder link for the non-terrestrial network; and communicating via the second feeder link according to the timing.

Aspect 2: The method of aspect 1, wherein: the at least one message comprises a timing adjust command; and adjusting the timing based on the at least one message comprises adjusting the timing based on the timing adjust command.

Aspect 3: The method of aspect 2, wherein: the timing adjust command comprises a timing advance adjustment or a timing advance absolute value to be used by a plurality of user equipment including the user equipment for communication via the second feeder link; and adjusting the timing based on the at least one message comprises adjusting a timing advance parameter for uplink communication based on the timing advance adjustment or the timing advance absolute value.

Aspect 4: The method of aspect 2, wherein: communication via the first feeder link is based on a cumulative timing advance parameter; the timing adjust command comprises a timing advance adjustment or a timing advance absolute value; and adjusting the timing based on the at least one message comprises adjusting the cumulative timing advance parameter based on the timing advance adjustment or setting the cumulative timing advance parameter to the timing advance absolute value.

Aspect 5: The method of aspect 2, further comprising: receiving a radio network temporary identifier (RNTI) for a plurality of user equipment including the user equipment; receiving a physical downlink control channel (PDCCH); and decoding the PDCCH based on the RNTI to recover scheduling information for a physical downlink shared channel (PDSCH) that carries the timing adjust command, wherein receiving the timing adjust command comprises receiving the timing adjust command based on the scheduling information.

Aspect 6: The method of aspect 2, wherein: the timing adjust command comprises a timing advance value, a modified slot offset, or a combination thereof to be used by a plurality of user equipment including the user equipment for communication via the second feeder link, wherein the modified slot offset is based on the timing advance value if the timing adjust command does not comprise the modified slot offset; and the method further comprises adjusting slot timing for the communication via the second feeder link based on the modified slot offset.

Aspect 7: The method of aspect 6, wherein the modified slot offset comprises a slot offset for at least one of: hybrid automatic repeat request (HARQ) timing, physical uplink shared channel (PUSCH) timing, media access control (MAC) control element (CE) application delay, sounding reference signal (SRS) triggering, channel state information (CSI) reporting, uplink transmission on a preconfigured uplink resource (PUR), or a random access response (RAR) window.

Aspect 8: The method of aspect 6, wherein: adjusting the slot timing comprises adding the modified slot offset to a first parameter, a second parameter, or a third parameter for hybrid automatic repeat request (HARQ) timing; the first parameter specifies a first time offset between a first slot in which the user equipment is to receive downlink data and a second slot in which the user equipment is to transmit HARQ feedback for the downlink data; the second parameter specifies a second time offset between a third slot in which the user equipment is to receive downlink control information that schedules an uplink data transmission and a fourth slot in which the user equipment is to transmit the uplink data transmission; and the third parameter specifies a third time offset between a fifth slot in which the user equipment is to transmits uplink data and a sixth slot in which the user equipment is to receive an acknowledgement for the uplink data.

Aspect 9: The method of any of aspects 1 through 8, further comprising: receiving an indication of whether a standard slot offset or a modified slot offset is to be used by a plurality of user equipment including the user equipment; and selecting the standard slot offset or the modified slot offset for communication via the second feeder link based on the indication.

Aspect 10: The method of any of aspects 1 through 9, wherein: the at least one message comprises a radio resource control (RRC) connection reconfiguration message; and the method further comprises switching from the first feeder link to the second feeder link based on the RRC connection reconfiguration message.

Aspect 11: The method of aspect 10, wherein: the RRC connection reconfiguration message indicates a feeder link switch wait period to be used by one or more of a plurality of user equipment including the user equipment; and the method further comprises waiting a period of time based on the feeder link switch wait period before commencing communication via the second feeder link.

Aspect 12: The method of aspect 10, wherein: the RRC connection reconfiguration message indicates that the user equipment is to send a physical random access channel (PRACH) preamble via the second feeder link; and the method further comprises sending the PRACH preamble via the second feeder link.

Aspect 13: The method of aspect 12, wherein: the RRC connection reconfiguration message comprises physical random access channel (PRACH) configuration parameters for the user equipment; and sending the PRACH preamble comprises sending the PRACH preamble via the second feeder link according to the PRACH configuration parameters.

Aspect 14: The method of any of aspects 1 through 13, further comprising: receiving a radio resource control (RRC) connection reconfiguration message that indicates a feeder link switch wait period to be used by one or more of a plurality of user equipment including the user equipment; determining that the RRC connection reconfiguration message does not indicate that the user equipment is to send a physical random access channel (PRACH) preamble via the second feeder link; and as a result of the determining that the RRC connection reconfiguration message does not indicate that the user equipment is to send a PRACH preamble via the second feeder link, waiting a period of time based on the feeder link switch wait period before commencing communication via the second feeder link.

Aspect 15: The method of any of aspects 1 through 14, wherein the at least one message comprises: a radio resource control (RRC) connection reconfiguration message; and a timing adjust command.

Aspect 17: A method for wireless communication at a base station, the method comprising: communicating with a plurality of user equipment via a first feeder link for a non-terrestrial network; generating at least one message indicating a switch from the first feeder link to a second feeder link for the non-terrestrial network for the communicating with the plurality of user equipment; and transmitting the at least one message to the plurality of user equipment.

Aspect 18: The method of aspect 17, wherein the at least one message comprises a timing adjust command.

Aspect 19: The method of aspect 18, wherein generating the at least one message comprises: determining a timing of the second feeder link or a difference in timing between the first feeder link and the second feeder link; and determining, based on the difference in timing or the timing of the second feeder link, a timing advance adjustment or a timing advance absolute value to be sent to the plurality of user equipment via the timing adjust command.

Aspect 20: The method of aspect 18, wherein generating the at least one message comprises: receiving at least one physical random access channel (PRACH) preamble from at least one of the plurality of user equipment; and determining, based on timing of the at least one PRACH preamble, a timing advance adjustment or a timing advance absolute value to be sent to the plurality of user equipment via the timing adjust command.

Aspect 21: The method of aspect 18, further comprising: generating scheduling information for a physical downlink shared channel (PDSCH) that is used for sending the timing adjust command; determining a radio network temporary identifier (RNTI) for the plurality of user equipment; and scrambling a physical downlink control channel (PDCCH) comprising the scheduling information, wherein the scrambling uses the RNTI.

Aspect 22: The method of aspect 18, wherein generating the at least one message comprises: determining a timing advance value to be used by the plurality of user equipment for communication via the second feeder link; modifying a slot offset to be used by the plurality of user equipment for the communication via the second feeder link, wherein modifying the slot offset comprises modifying the slot offset based on the timing advance value.

Aspect 23: The method of aspect 22, wherein the slot offset is for at least one of: hybrid automatic repeat request (HARQ) timing, physical uplink shared channel (PUSCH) timing, media access control (MAC) control element (CE) application delay, sounding reference signal (SRS) triggering, channel state information (CSI) reporting, or a random access response (RAR) window.

Aspect 24: The method of aspect 22, further comprising: determining whether a standard slot offset or a modified slot offset is to be used by the plurality of user equipment for communication via the second feeder link; and sending, to the plurality of user equipment, an indication of the determining of whether the standard slot offset of the modified slot offset is to be used.

Aspect 25: The method of any of aspects 17 through 24, wherein: the at least one message comprises a radio resource control (RRC) connection reconfiguration message; and sending the at least one message comprises sending the RRC connection reconfiguration message to the plurality of user equipment prior to the switch from the first feeder link to the second feeder link.

Aspect 26: The method of aspect 25, further comprising: determining a feeder link switch wait period to be used by one or more of the plurality of user equipment, wherein the RRC connection reconfiguration message indicates the feeder link switch wait period.

Aspect 27: The method of aspect 25, wherein the RRC connection reconfiguration message identifies at least one of the plurality of user equipment that is to send a physical random access channel (PRACH) preamble to the base station via the second feeder link.

Aspect 28: The method of any of aspects 17 through 27, further comprising: determining physical random access channel (PRACH) configuration parameters for at least one of the plurality of user equipment that is to send a PRACH preamble to the base station via the second feeder link, wherein the RRC connection reconfiguration message includes the PRACH configuration parameters.

Aspect 29: The method of any of aspects 17 through 28, wherein the at least one message comprises: a radio resource control (RRC) connection reconfiguration message; and a timing adjust command.

Aspect 30: A user equipment (UE) comprising: a transceiver configured to communicate with a radio access network, a memory, and a processor communicatively coupled to the transceiver and the memory, wherein the processor and the memory are configured to perform any one of aspects 1 through 15.

Aspect 31: An apparatus configured for wireless communication comprising at least one means for performing any one of aspects 1 through 15.

Aspect 32: A non-transitory computer-readable medium storing computer-executable code, comprising code for causing an apparatus to perform any one of aspects 1 through 15.

Aspect 33: A base station (BS) comprising: a transceiver, a memory, and a processor communicatively coupled to the transceiver and the memory, wherein the processor and the memory are configured to perform any one of aspects 17 through 29.

Aspect 34: An apparatus configured for wireless communication comprising at least one means for performing any one of aspects 17 through 29.

Aspect 35: A non-transitory computer-readable medium storing computer-executable code, comprising code for causing an apparatus to perform any one of aspects 17 through 29.

Several aspects of a wireless communication network have been presented with reference to example implementations. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing Institute of Electrical and Electronics Engineers (IEEE) 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-15 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 4-9, and 12 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(1) unless the element is expressly recited using the phrase "means for" or, in the case of a method claim, the element is recited using the phrase "step for."

What is claimed is:

1. A method for wireless communication at a first user equipment, comprising:
   receiving a first message via a first feeder link for a non-terrestrial network, the first message indicating a feeder link switch from the first feeder link to a second feeder link for the non-terrestrial network, the first message further indicating that the first user equipment is to transmit a physical random access channel (PRACH) preamble via the second feeder link prior to the feeder link switch;
   transmitting the PRACH preamble via the second feeder link prior to the feeder link switch;
   receiving a second message via the second feeder link, the second message indicating a timing adjust value to be used by a plurality of user equipment including the first user equipment for communication via the second feeder link; and
   communicating via the second feeder link according to the timing adjust value.

2. The method of claim 1, wherein:
   the second message comprises a timing adjust command; and
   the method further comprises adjusting transmission timing based on the timing adjust command.

3. The method of claim 2, wherein:
   the timing adjust command comprises a timing advance adjustment or a timing advance absolute value to be used by the plurality of user equipment including the first user equipment for the communication via the second feeder link; and
   adjusting the transmission timing based on the timing adjust command comprises adjusting a timing advance parameter for uplink communication based on the timing advance adjustment or the timing advance absolute value.

4. The method of claim 2, wherein:
   communication via the first feeder link is based on a cumulative timing advance parameter;
   the timing adjust command comprises a timing advance adjustment or a timing advance absolute value; and adjusting the transmission timing based on the timing adjust command comprises adjusting the cumulative timing advance parameter based on the timing advance adjustment or setting the cumulative timing advance parameter to the timing advance absolute value.

5. The method of claim 2, further comprising:
receiving a radio network temporary identifier (RNTI) associated with communication of the timing adjust command for the plurality of user equipment including the first user equipment;
receiving a physical downlink control channel (PDCCH); and
decoding the PDCCH based on the RNTI to recover scheduling information for a physical downlink shared channel (PDSCH) that carries the timing adjust command,
wherein receiving the second message comprises receiving the timing adjust command based on the scheduling information.

6. The method of claim 2, wherein:
the timing adjust command comprises a timing advance value, a modified slot offset, or a combination thereof to be used by the plurality of user equipment including the first user equipment for the communication via the second feeder link, wherein the modified slot offset is based on the timing advance value if the timing adjust command does not comprise the modified slot offset; and
the method further comprises adjusting slot timing for the communication via the second feeder link based on the modified slot offset.

7. The method of claim 6, wherein the modified slot offset comprises a slot offset for at least one of: hybrid automatic repeat request (HARQ) timing, physical uplink shared channel (PUSCH) timing, media access control (MAC) control element (CE) application delay, sounding reference signal (SRS) triggering, channel state information (CSI) reporting, uplink transmission on a preconfigured uplink resource (PUR), or a random access response (RAR) window.

8. The method of claim 6, wherein:
adjusting the slot timing comprises adding the modified slot offset to a first parameter, a second parameter, or a third parameter for hybrid automatic repeat request (HARQ) timing;
the first parameter specifies a first time offset between a first slot in which the first user equipment is to receive downlink data and a second slot in which the first user equipment is to transmit HARQ feedback for the downlink data;
the second parameter specifies a second time offset between a third slot in which the first user equipment is to receive downlink control information that schedules an uplink data transmission and a fourth slot in which the first user equipment is to transmit the uplink data transmission; and
the third parameter specifies a third time offset between a fifth slot in which the first user equipment is to transmits uplink data and a sixth slot in which the first user equipment is to receive an acknowledgement for the uplink data.

9. The method of claim 1, further comprising:
receiving an indication of whether a standard slot offset or a modified slot offset is to be used by the plurality of user equipment including the first user equipment; and
selecting the standard slot offset or the modified slot offset for the communication via the second feeder link based on the indication.

10. The method of claim 1, wherein:
the second message comprises a radio resource control (RRC) connection reconfiguration message; and
the method further comprises switching from the first feeder link to the second feeder link based on the RRC connection reconfiguration message.

11. The method of claim 10, wherein:
the RRC connection reconfiguration message indicates a feeder link switch wait period to be used by one or more of the plurality of user equipment including the first user equipment; and
the method further comprises waiting a period of time based on the feeder link switch wait period before commencing the communication via the second feeder link.

12. The method of claim 10, wherein:
the RRC connection reconfiguration message comprises physical random access channel (PRACH) configuration parameters for the first user equipment; and
transmitting the PRACH preamble comprises transmitting the PRACH preamble via the second feeder link according to the PRACH configuration parameters.

13. The method of claim 1, wherein the second message comprises:
a radio resource control (RRC) connection reconfiguration message; and
a timing adjust command.

14. A first user equipment, comprising:
a transceiver;
a memory; and
a processor communicatively coupled to the transceiver and the memory, wherein the processor and the memory are configured to:
receive a first message via a first feeder link for a non-terrestrial network, the first message indicating a feeder link switch from the first feeder link to a second feeder link for the non-terrestrial network, the first message further indicating that the first user equipment is to transmit a physical random access channel (PRACH) preamble via the second feeder link prior to the feeder link switch;
transmit the PRACH preamble via the second feeder link prior to the feeder link switch;
receive a second message via the second feeder link, the second message indicating a timing adjust value to be used by a plurality of user equipment including the first user equipment for communication via the second feeder link; and
communicate via the second feeder link according to the timing adjust value.

15. A method for wireless communication at a base station, comprising:
communicating with a plurality of user equipment via a first feeder link for a non-terrestrial network; and
transmitting a first message to the plurality of user equipment via the first feeder link, the first message indicating a feeder link switch from the first feeder link to a second feeder link for the non-terrestrial network, the first message further indicating that each user equipment of the plurality of user equipment is to transmit a physical random access channel (PRACH) preamble via the second feeder link prior to the feeder link switch.

16. The method of claim 15, further comprising:
generating scheduling information for a physical downlink shared channel (PDSCH) that is used for sending the first message;

determining a radio network temporary identifier (RNTI) for the plurality of user equipment; and
scrambling a physical downlink control channel (PDCCH) comprising the scheduling information, wherein the scrambling uses the RNTI.

17. The method of claim 15, further comprising:
transmitting, to the plurality of user equipment, an indication of whether a standard slot offset or a modified slot offset is to be used by the plurality of user equipment for communication via the second feeder link.

18. The method of claim 15, wherein:
the first message comprises a radio resource control (RRC) connection reconfiguration message; and
transmitting the first message comprises transmitting the RRC connection reconfiguration message to the plurality of user equipment prior to the feeder link switch from the first feeder link to the second feeder link.

19. The method of claim 18,
wherein the RRC connection reconfiguration message indicates a feeder link switch wait period to be used by one or more of the plurality of user equipment.

20. The method of claim 18,
wherein the RRC connection reconfiguration message includes physical random access channel (PRACH) configuration parameters for at least one of the plurality of user equipment that is to send the PRACH preamble via the second feeder link.

21. The method of claim 15, wherein the first message comprises:
a radio resource control (RRC) connection reconfiguration message; and
a timing adjust command.

22. A base station, comprising:
a transceiver;
a memory; and
a processor communicatively coupled to the transceiver and the memory, wherein the processor and the memory are configured to:
communicate with a plurality of user equipment via a first feeder link for a non-terrestrial network, and
transmit a first message via the first feeder link, the first message indicating a feeder link switch from the first feeder link to a second feeder link for the non-terrestrial network, the first message further indicating that each user equipment of the plurality of user equipment is to transmit a physical random access channel (PRACH) preamble via the second feeder link prior to the feeder link switch.

* * * * *